United States Patent
Treesh

(10) Patent No.: US 10,263,690 B2
(45) Date of Patent: Apr. 16, 2019

(54) HANDOVER BASED ON PREDICTED NETWORK CONDITIONS

(71) Applicant: ViaSat, Inc., Carlsbad, CA (US)

(72) Inventor: Fred Treesh, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 25 days.

(21) Appl. No.: 15/666,257

(22) Filed: Aug. 1, 2017

(65) Prior Publication Data
US 2019/0044611 A1   Feb. 7, 2019

(51) Int. Cl.
*H04B 7/185* (2006.01)
*H04W 36/24* (2009.01)

(52) U.S. Cl.
CPC ........ *H04B 7/18508* (2013.01); *H04W 36/24* (2013.01)

(58) Field of Classification Search
CPC ........................... H04B 7/18508; H04W 36/24
See application file for complete search history.

(56) References Cited

U.S. PATENT DOCUMENTS

| | | | | |
|---|---|---|---|---|
| 6,385,513 B1 * | 5/2002 | Murray | .............. | H04B 7/18508 340/945 |
| 6,775,251 B1 * | 8/2004 | Wiedeman | ......... | H04B 7/18558 370/316 |
| 9,621,850 B1 * | 4/2017 | Mitchell | .................. | H04N 7/15 |
| 10,116,379 B2 * | 10/2018 | Garcia | ............... | H04B 7/18513 |
| 2012/0021740 A1 | 1/2012 | Vaidyanathan et al. | | |
| 2017/0311178 A1 * | 10/2017 | Feria | .................. | H04B 7/18506 |
| 2018/0167644 A1 * | 6/2018 | Frisco | ................ | H04B 7/18508 |
| 2018/0269958 A1 * | 9/2018 | Garcia | ............... | H04B 7/18513 |

OTHER PUBLICATIONS

Ribeiro, Russell; Gilat Satellite Networks Ltd, "GILAT Americas—Aero Business" 14 pgs.

\* cited by examiner

*Primary Examiner* — Tejis Daya
(74) *Attorney, Agent, or Firm* — Holland & Hart LLP

(57) ABSTRACT

Methods and systems are described for providing satellite beam handover based on predicted network conditions. In embodiments, a satellite communications system retrieves flight plan data for a plurality of aircraft being provided a network access service, identifies, for each aircraft respective candidate satellite beams of the plurality of satellite beams for providing the network access service, each candidate satellite beam having an associated service timeframe for providing the network access service, obtains, for each of the respective candidate satellite beams, a beam utilization score indicative of predicted beam utilization by the plurality of aircraft over the associated service timeframe, selects satellite beams for providing the network access service of each aircraft of the plurality of aircraft based at least in part on the beam utilization scores, and schedules handover of the network access service for the plurality of aircraft to the selected satellite beams.

36 Claims, 11 Drawing Sheets

HANDOVER BASED ON PREDICTED NETWORK CONDITIONS

BACKGROUND

The present disclosure relates to wireless communications in general, and in particular, to satellite beam handover based on predicted network conditions.

Increasingly, passengers on commercial aircraft desire broadband network access while in-flight. Passenger aircraft may receive network access service via a shared communication link such as a satellite communications link. The aircraft may have an on-board multi-user access terminal that communicates with ground stations (e.g., via a satellite of a satellite communications system) and provides network access connectivity for the passengers. For example, users may connect their communication devices (e.g., smartphones, laptops, tablets, etc.) to a wireless local area network (WLAN) served by the multi-user access terminal, which routes data communications to other networks (e.g., the Internet) via the shared communication link. The satellite communications system may be a multi-beam satellite system and the shared communication link may use resources of a satellite beam for the shared communication link. While the resources of each satellite beam may be flexibly applied, each aircraft may represent a large number of users, all potentially accessing broadband content concurrently. Increasing bandwidth for wireless communications systems is expensive and sometimes additional usable spectrum is unavailable. An aircraft within the coverage area of a satellite beam may have a large impact on the utilization of network resources within the beam, and in some instances particular beams of a satellite system may become over-utilized.

SUMMARY

Methods, systems, and devices for predictive satellite beam handover based on network conditions are described. As demand for network service from fixed terminals and mobile users on aircraft compete for limited system resources, satellite communications systems may utilize techniques to better distribute scarce network resources. These techniques may allow for optimized use of network resources for aircraft in service areas or service periods where greater network demand is expected.

A beam handover manager may enhance efficiency of use of network resources of a satellite system over a service timeframe employing the described techniques. Based on flight plan data for a plurality of aircraft, the beam handover manager determines a candidate set of satellite beams of the satellite system to provide network access service to aircraft over the service timeframe. A beam utilization score, which indicates predicted beam utilization for each satellite beam, is calculated for each satellite beam over the service timeframe. The beam handover manager then determines whether the beam utilization score for each satellite beam meets a beam utilization criteria over the service timeframe. If the criteria is met, the beam handover manager may accept the candidate set of satellite beams as satisfactorily being able to provide network access service to the aircraft over the service timeframe. The beam handover manager then schedules handovers for the aircraft based on the respective candidate sets of satellite beams. However, if the criteria is not met, the beam handover manager may utilize a variety of techniques to adjust the candidate sets of satellite beams in order to have the beam utilization scores for the satellite beams meet the beam utilization criteria.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features relate to satellite beam handover based on predicted network conditions. The described handover techniques may use flight plan data to identify candidate satellite beams for providing network service for a plurality of aircraft. Each of the candidate satellite beams may be available for providing the network service over a particular service timeframe based on the beam coverage areas and the flight plan data. The techniques may then obtain a beam utilization score for each of the candidate satellite beams, the score indicating the predicted beam utilization of the candidate satellite beam over an associated service timeframe. The techniques allow for a satellite communications system to select satellite beams for providing network service of each aircraft based on the candidate satellite beams' beam utilization scores. After the satellite beams are selected, the system may then schedule handovers or a series of handovers of network service for the aircraft to the selected satellite beams.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
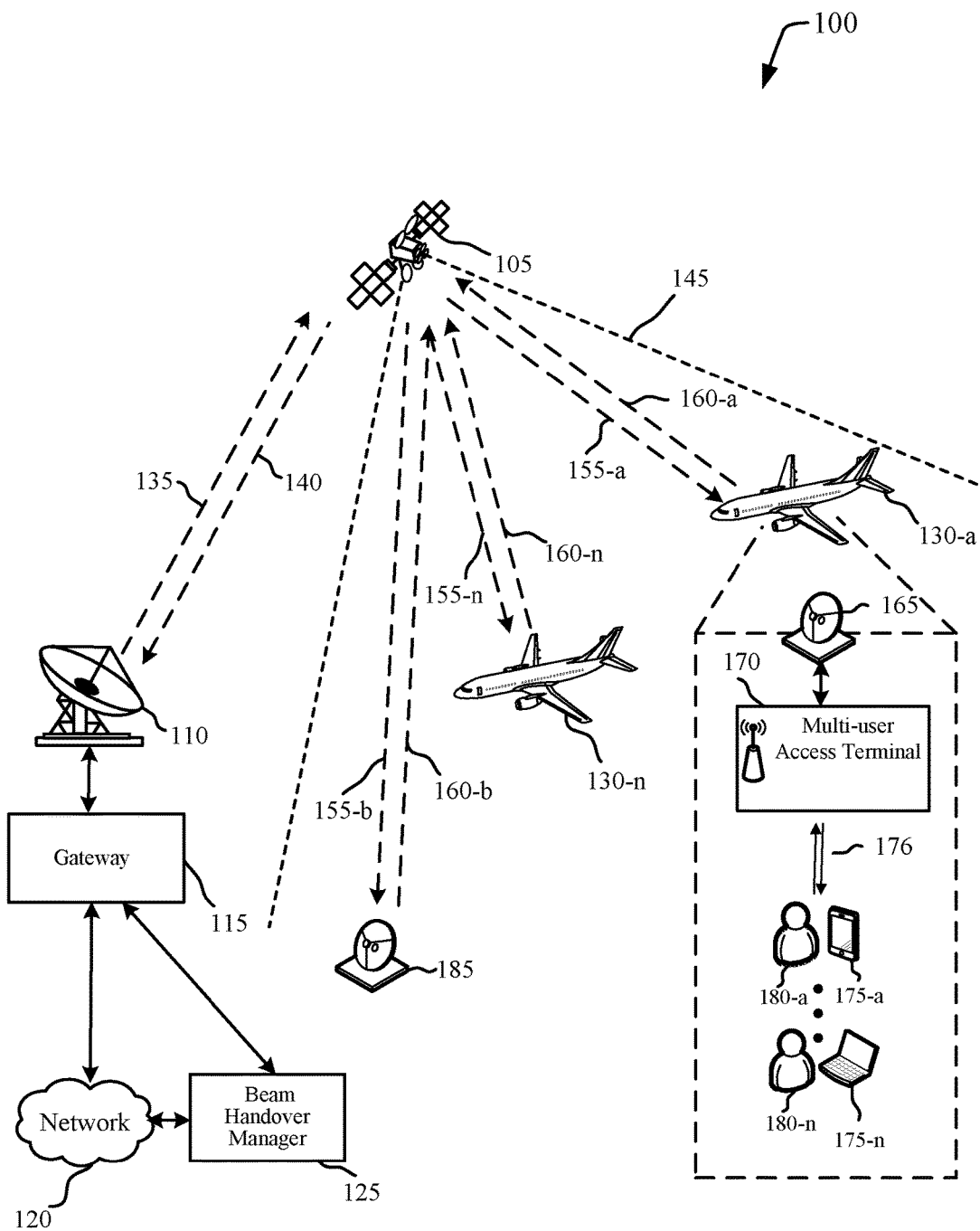
FIG. 1 is a simplified diagram of a satellite communications system in which the principles included herein may be described.

FIG. 1 is a simplified diagram of a satellite communications system 100 in which the principles included herein may be described. The satellite communications system 100 may provide network access service to users 180 on-board mobile vessels 130-a. The network access service may be provided to the users 180 via a multi-user access terminal 170, to which users 180 may connect their communication devices 175 via wired (e.g., Ethernet) or wireless (e.g., WLAN) connections 176. The multi-user access terminal 170 may obtain the network access service via a satellite beam 145. The satellite communications system 100 is a multiple access system capable of providing network service for multiple mobile vessels 130 (e.g., mobile vessels 130-a, 130-n, etc.) and the network users 180 of each mobile vessels 130. It should be noted that although mobile vessels 130-a through 130-n are illustrated as aircraft and aircraft are used as examples in the description that follows, references to aircraft may also be any type of mobile vessel transporting multiple passengers such as buses, trains, ships, etc.

The satellite communications system 100 may include any suitable type of satellite system, including a geostationary satellite system, medium earth orbit (MEO), or low earth orbit (LEO) satellite system. Although only a single satellite beam 145 is illustrated, the satellite 105 may be a multi-beam satellite, transmitting a number (e.g., typically 20-500, etc.) of satellite beams 145 each directed at a different region of the earth. The satellite beams 145 of satellite 105 may include satellite beams that may be of different sizes from each other. The number of satellite beams 145 can allow coverage of a relatively large geographical area and frequency re-use within the covered area. Frequency re-use in multi-beam satellite systems permits an increase in capacity of the system for a given system bandwidth. Although illustrated as including one satellite 105, the satellite communications system 100 may include multiple satellites. The multiple satellites may have service coverage areas that at least partially overlap with each other.

The satellite communications system 100 includes a gateway system 115 and a network 120, which may be connected together via one or more wired or wireless links. The gateway system 115 is configured to communicate with one or more aircraft 130 via satellite 105. The network 120 may include any suitable public or private networks and may be connected to other communications networks (not shown) such as the Internet, telephony networks (e.g., Public Switched Telephone Network (PSTN), etc.), and the like. The network 120 may connect the gateway system 115 with other gateway systems, which may also be in communication with the satellite 105. Alternatively, a separate network linking gateways and other nodes may be employed to cooperatively service user traffic. Gateway system 115 may also be configured to receive return link signals from fixed terminals 185 and aircraft 130 (via the satellite 105) that are directed to a destination in the network 120 or the other communication networks.

The gateway system 115 may be a device or system that provides an interface between the network 120 and the satellite 105. The gateway system 115 may use an antenna 110 to transmit signals to and receive signals from the satellite 105 via a gateway uplink 135 and a gateway downlink 140. The antenna 110 may be two-way capable and designed with adequate transmit power and receive sensitivity to communicate reliably with the satellite 105. In one embodiment, satellite 105 is configured to receive signals from the antenna 110 within a specified frequency band and specific polarization.

The satellite communications system 100 also includes a beam handover manager 125, which may be coupled with gateway system 115 and/or network 120. The beam handover manager 125 may receive flight plan data for aircraft 130 that are being provided network access service by satellite communications system 100. The beam handover manager 125 may receive flight plan data for aircraft 130 that are already in flight at the time the flight plan data is initially received or updated, or for aircraft that are not yet in flight but have filed a flight plan or otherwise have a planned flight path. For example, the flight plan data may be received for each of multiple aircraft 130, from a centralized database accessible via network 120, etc. The centralized database may include, for example, filed flight plan information (e.g., flight paths filed with the Federal Aviation Administration (FAA), etc.), and may be supplemented with current status information (e.g., takeoff information, GPS coordinates, flight delays, etc.). The flight plan data may include present route information, planned route information, or other path related information associated with the aircraft 130. For example, planned information can include origin and destination locations, and planned travel path, altitude, speed, etc. over the trip. Present information can include present (or last reported) location, altitude, speed, etc. Other path related information may include weather patterns or historical data from similar trips.

The beam handover manager 125 may use the received flight plan data to identify candidate satellite beams for providing network service to mobile multi-user terminals on multiple aircraft 130 over a service timeframe, which may be the time over which the flight plan data is known, or some other time interval. Each of the candidate satellite beams may be available for providing the network service to different aircraft over different service windows. The flight plan data may include predicted flight route information, or other information (e.g., departure location, destination location, departure time, estimated arrival time, etc.) from which a flight path may be estimated for the aircraft.

Beam handover manager 125 may then obtain a beam utilization score for each of the candidate satellite beams, the score indicating the predicted beam utilization of the candidate satellite beam over an associated service timeframe. The predicted beam utilization of a candidate satellite beam may be based on the predicted network demands for any multi-user access terminals 170 and/or fixed terminals 185 to be serviced by the candidate satellite beam within the associated service timeframe. Beam handover manager 125 may then select satellite beams for providing network service of each aircraft based on the satellite beams' beam utilization scores. After the satellite beams are selected, beam handover manager 125 may then schedule handovers or a series of handovers of network service for the aircraft 130 to the selected satellite beams. The manner in which the beam handover manager 125 schedules the handover(s) to the selected satellite beam(s) for each aircraft 130 can vary from embodiment to embodiment. In some embodiments, the beam handover manager 125 schedules the handover(s) by storing data in memory indicating each of the selected satellite beam(s) and the time to handover to each. When is it time for handover, the beam handover manager 125 can then notify the aircraft 130 by communicating a message via the satellite communications system 100 to the corresponding multi-user access terminal 170 indicating the selected satellite beam. The message may include a unique identifier of the multi-user access terminal 170 and/or aircraft 130 that can be used to determine the message is intended for it. In response to the message, the multi-user access terminal 170 can then handover communications to the selected satellite beam. Handover of communications to the selected satellite beam may, for example, include changing one or more parameters of the multi-user access terminal 170 such as the operating frequencies, polarization, power level, etc. In embodiments in which the handover includes switching communication to a second satellite, this may also include repointing of the antenna 165 at the second satellite.

In other embodiments, the beam handover manager 125 schedules the handover(s) by communicating a respective message to each aircraft 130 indicating some or all of the selected satellite beam(s) and the time to handover to each. The multi-user access terminal 170 of each aircraft 130 can store its respective message in memory. When it is time for handover, the multi-user access terminal 170 can then handover communications to the selected satellite beam.

Each satellite beam 145 of the satellite 105 may support the aircraft 130 within its coverage area (e.g., providing uplink and downlink resources). The coverage of different satellite beams 145 may be non-overlapping or have varying measures of overlap. Satellite beams 145 of the satellite 105 may be tiled and partially overlapping to provide complete or almost complete coverage for a relatively large geographical area where partially overlapping (e.g., at a beam contour defined by a beam strength or gain for providing service via the beam) beams use different ranges of frequencies and/or polarizations (e.g., different colors). Some satellite beams 145 may be sized differently (have a different beamwidth) than other satellite beams 145. For example, the coverage area of one satellite beam may be partially overlapping or located entirely within a different satellite beam. Some satellite beams 145 may be targeted at areas of higher demand (e.g., more densely populated areas), while other satellite beams 145 provide service over larger areas. Thus, an aircraft 130 at any given location may be able to be served by one of multiple available satellite beams, which may be satellite beams of the same satellite, or different satellites, in some cases.

The multi-user access terminal 170 may use an antenna 165 mounted on aircraft 130-a to communicate signals with the satellite 105 via a satellite beam downlink 155-a and satellite beam uplink 160-a. The antenna 165 may be mounted to an elevation and azimuth gimbal which points the antenna 165 (e.g., actively tracking) at satellite 105. The satellite communications system 100 may operate in the International Telecommunications Union (ITU) Ku, K, or Ka-bands, for example from 17.7 to 21.2 Giga-Hertz (GHz) in the downlink portion and from 27.5 to 31 GHz in the uplink portion of the Ka band. Alternatively, satellite communications system 100 may operate in other frequency bands such as C-band, X-band, S-band, L-band, and the like.

In satellite communication system 100, users 180-a to 180-n may utilize the network access service via mobile devices 175. Each user 180-a to 180-n may be provided service via the satellite communication system 100 by connecting (e.g., via a wired or wireless connection) a mobile device 175 (e.g., desktop computer, laptop, set-top box, smartphone, tablet, Internet-enabled television, and the like) to the multi-user access terminal 170. As illustrated in FIG. 1, mobile devices 175-a to 175-n are connected via wired or wireless connections 176 (e.g., Wi-Fi, Ethernet, etc.) to multi-user access terminal 170. Multi-user access terminal 170 may receive data from satellite 105 via satellite beam downlink 155-a and transmit data to satellite 105 via satellite beam uplink 160-a. Other aircraft within the satellite beam 145 such as aircraft 130-n may receive data from satellite 105 via satellite beam downlink 155-n and transmit data to satellite 105 via satellite beam uplink 160-n. While satellite communication system 100 is illustrated providing mobile network access service to mobile users 180 aboard aircraft 130, it can be appreciated that the principles described herein for providing network access service to mobile users may be provided using multi-user access terminals positioned in fixed locations or on various modes of transportation where multiple mobile users may desire network access via satellite communications system 100 (e.g., trains, boats, busses, etc.).

Each satellite beam 145 of the satellite 105 may also support a number of fixed terminals 185. Fixed terminals 185 may receive data from satellite 105 via satellite beam downlink 155-b and transmit data via satellite beam uplink 160-b. A fixed terminal 185 may be any two-way satellite ground station such as a very small aperture terminal (VSAT). A fixed terminal 185 may provide services to subscribers associated with the fixed terminal such as data, voice, and video signals. Each fixed terminal may typically provide service to a small number of users (e.g., a residence or business). As illustrated in FIG. 1, a satellite beam 145, assigned to a particular frequency range and polarization, may carry satellite beam downlinks 155 or satellite beam uplinks 160 for both fixed terminals 185 and multi-user access terminals 170. The satellite beam downlinks 155 or satellite beam uplinks 160 for fixed terminals 185 and multi-user access terminals 170 may be multiplexed within the satellite beam 145 using multiplexing techniques such as time-division multiple access (TDMA), frequency-division multiple access (FDMA), multi-frequency time-division multiple access (MF-TDMA), code-division multiple access (CDMA), orthogonal frequency division multiple access (OFDMA), and the like.

Figure 2:
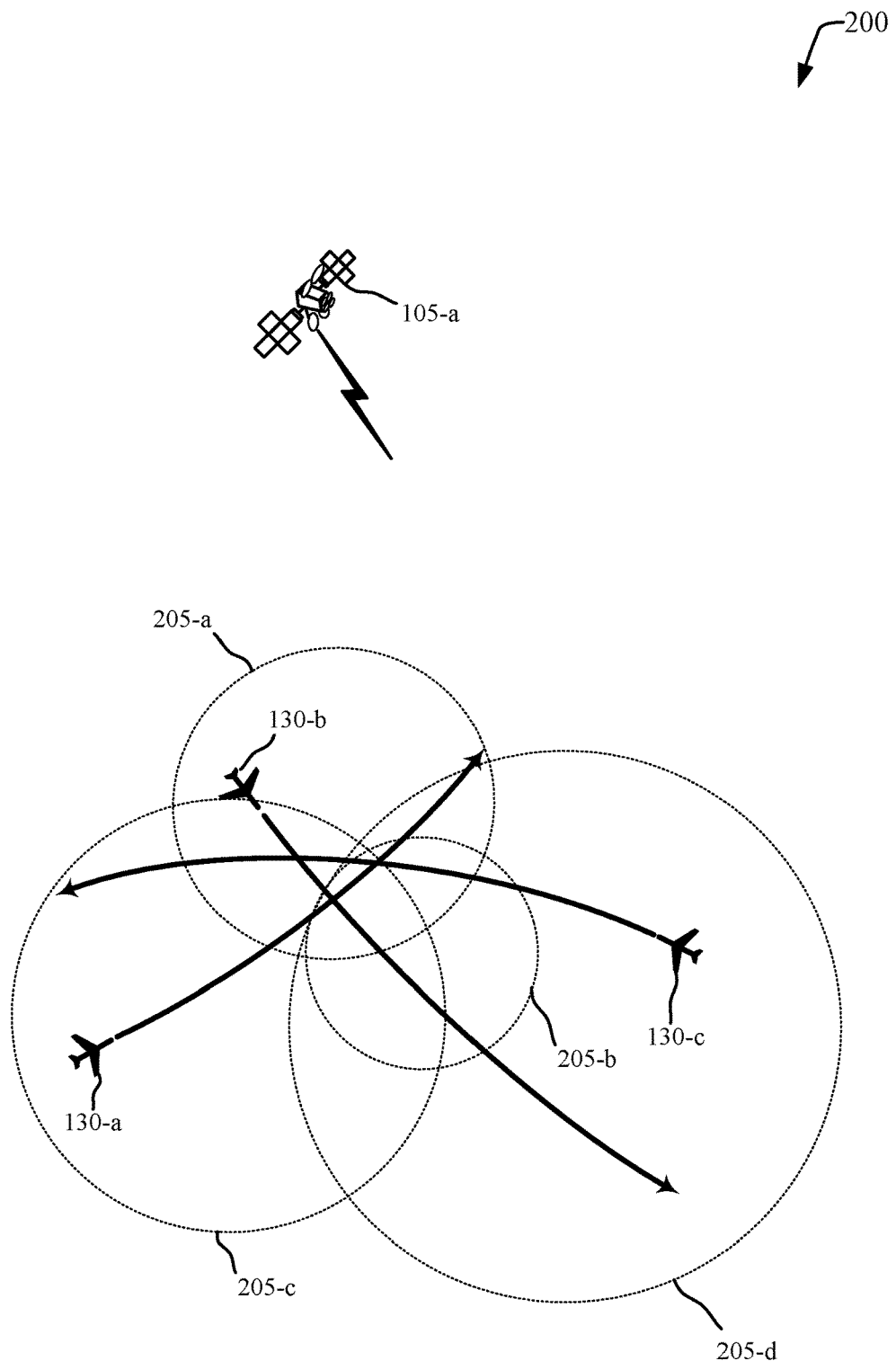
FIG. 2 is a diagram showing an example of a service area with a satellite providing network coverage with satellite beams in accordance with various aspects of the present disclosure.

FIG. 2 is a diagram showing an example of a service area 200 with satellite 105-a providing network coverage with satellite beams in accordance with various aspects of the present disclosure. The satellite 105-a may use a particular system bandwidth and have multiple satellite beams 205-a, 205-b, 205-c, and 205-d (shown by their associated satellite beam coverage areas). The satellite beams 205 may each use portions of the system resources (e.g., a polarization and a portion of the system bandwidth, etc.). The satellite beam coverage areas may illustrate a given beam contour level of the corresponding satellite beam associated with a minimum desired signal level for service via the satellite beam. For example, the satellite beam coverage areas may represent a −1 dB, −2 dB, or −3 dB attenuation from the peak gain, or may be defined by an absolute signal strength, signal-to-noise ratio (SNR), or signal-to-interference plus noise ratio (SINR) level. The satellite beam coverage areas for satellite beams 205 may be different sizes and/or dimensions for various reasons such as satellite azimuth, frequency, or intentional beam-shaping techniques (e.g., shaped antenna systems, beamforming, etc.). Each satellite beam 205 may service one or more aircraft within its satellite beam coverage area, and aircraft within more than one satellite beam 205 may be serviced by any one of the satellite beams at a given time.

The illustrated service area 200 may be a region within an overall service area of satellite 105-a and may include other satellite beams that are not shown in FIG. 2 for the sake of clarity. Satellite 105-a may be a part of various types of satellite systems. For example, satellite 105-a may utilize a fixed beam architecture where the satellite beams may each be intentionally fixed on particular geographic areas. A fixed beam refers to a spot beam for which the angular beamwidth and coverage area does not intentionally vary with time. Geostationary satellites often use fixed beams. In some examples, satellite beam coverage areas of adjacent satellite beams in a fixed beam system may be partially overlapping to provide continuous coverage, and overlapping satellite beams use different ranges of frequencies and/or polarizations (e.g., colors). In other examples, satellite 105-a may be part of a Low Earth Orbit (LEO) satellite system. To maintain a stable low Earth orbit, a satellite in a LEO satellite system needs to sustain a minimum orbital velocity which may not be the same speed at which the Earth rotates. Because a particular satellite's orbit is not geostationary, satellite 105-a may be a network of satellites in order to provide continuous coverage over service area 200. The network of satellites may move following a similar orbit path in order to provide continuous network service to service area 200.

FIG. 2 shows the flight plans for multiple aircraft 130 flying or scheduled to fly through the service area 200 within a service timeframe. For example, aircraft 130-a, 130-b, and 130-c may be traveling or are forecasted to travel through satellite beams 205-a, 205-b, 205-c, and 205-d. Beam handover manager 125 may determine the forecasted travel paths for each of aircraft 130 through flight plan data that beam handover manager 125 receives for each aircraft 130.

From the current geographic locations and forecasted travel paths of each aircraft 130, beam handover manager 125 may determine the predicted locations of each aircraft 130 during a service timeframe (e.g., a predetermined period of time or a time period for which flight data is known, etc.). Based on the predicted locations, beam handover manager 125 may identify prospective candidate satellite beams that may be able to provide network access service to each aircraft 130 within the service timeframe. Each prospective candidate satellite beam may have an associated service window for each aircraft 130 for which it can provide network service during the service timeframe.

Figure 3:
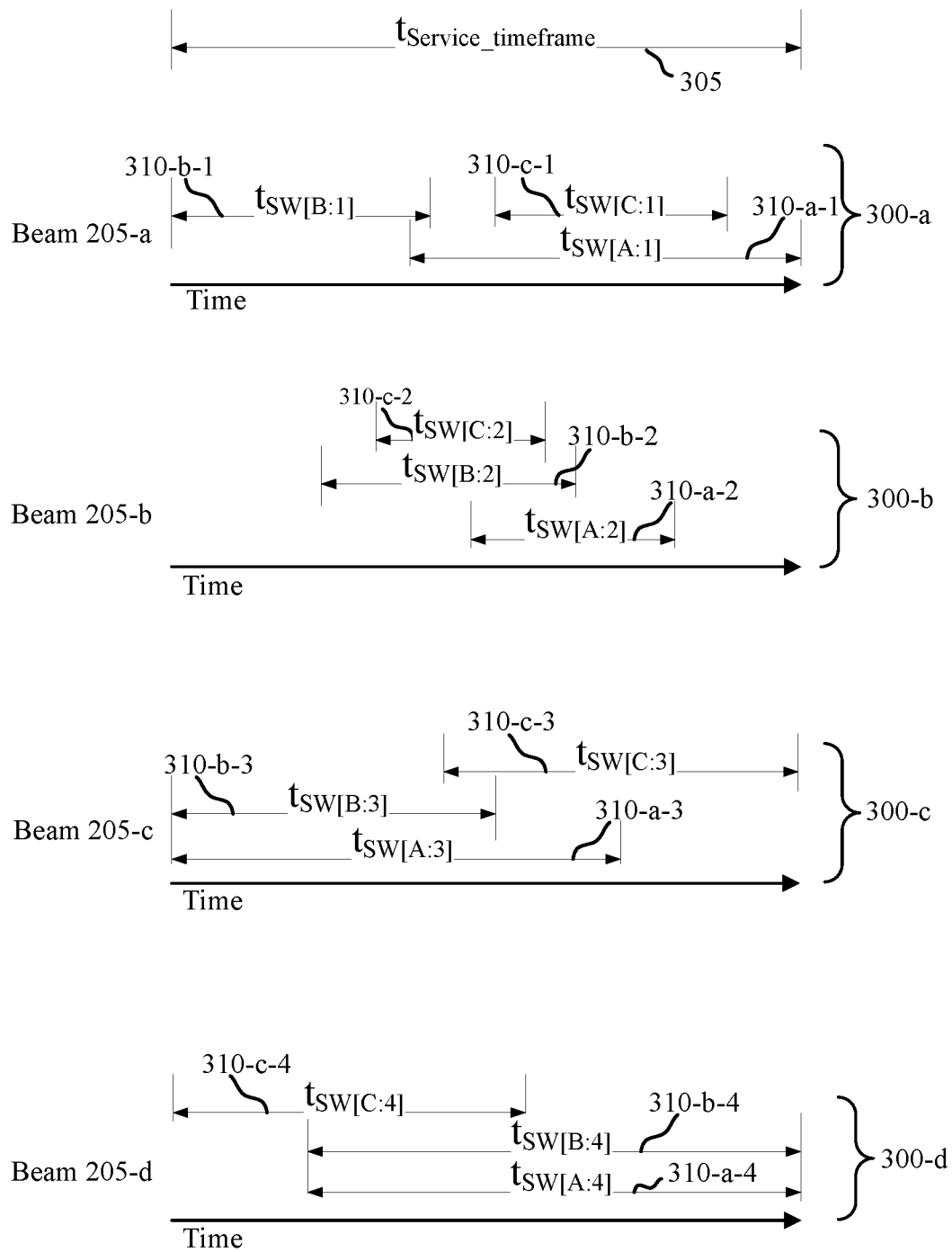
FIG. 3 illustrates service availabilities depicting determination of candidate satellite beams for aircraft based on flight plan data, in accordance with various aspects of the present disclosure.

FIG. 3 illustrates service availabilities 300-a, 300-b, 300-c, and 300-d depicting determination of candidate satellite beams for aircraft based on flight plan data, in accordance with various aspects of the present disclosure. For example, FIG. 3 may illustrate when satellite beams 205-a, 205-b, 205-c, and 205-d may provide network service to aircraft 130-a, 130-b, and 130-c of FIG. 2 over service timeframe 305. Service timeframe 305 may be a fixed period of time (e.g., a given number of minutes or hours, etc.), or may be dynamically determined based on the availability of flight data or estimated accuracy of flight data over time.

Specifically, service availability 300-a illustrates service windows $t_{SW}$[A:1] 310-a-1, $t_{SW}$[B:1] 310-b-1, and $t_{SW}$[C:1] 310-c-1 when satellite beam 205-a of FIG. 2 is a candidate beam for aircraft 130-a, 130-b, and 130-c, respectively. As can be seen from FIG. 2, aircraft 130-b begins its flight plan within the coverage area of satellite beam 205-a, which is shown in FIG. 3 by service window $t_{SW}$[B:1] 310-b-1 starting at the beginning of service timeframe 305. The flight plan data for aircraft 130-a and 130-c show them to be outside the coverage area for satellite beam 205-a at the beginning of the service timeframe 305 (which may be the current time). Thus, service windows $t_{SW}$[A:1] 310-a-1 and $t_{SW}$[C:1] 310-c-1 do not start at the beginning of the service timeframe 305. FIG. 2 illustrates aircraft 130-b and 130-c exiting the coverage area of satellite beam 205-a prior to the end of the service timeframe 305, which is depicted in FIG. 3 by service windows $t_{SW}$[B:1] 310-b-1 and $t_{SW}$[C:1] 310-c-1, respectively, terminating before the end of service timeframe 305. However, as shown by service window 310-a-1, once within the coverage area of satellite beam 205-a, aircraft 130-a does not exit the coverage area of satellite beam 205-a prior to the end of service timeframe 305.

In another example, service availability 300-b for satellite beam 205-b from FIG. 2 also shows that satellite beam 205-b provides network service to aircraft 130-a, 130-b, and 130-c at different times and for different durations. In service availability 300-b, the service windows $t_{SW}$[A:2] 310-a-2, $t_{SW}$[B:2] 310-b-2, and $t_{SW}$[C:2] 310-c-2 show the time periods that satellite beam 205-b is a candidate beam for providing service to aircraft 130-a, 130-b, and 130-c, respectively. As can be seen in FIG. 2, aircraft 130-a, 130-b, and 130-c all begin their flight paths in coverage areas of satellite beams other than satellite beam 205-b. This is illustrated in FIG. 3 where no service windows commence at the beginning of service timeframe 305. Additionally, aircraft 130-a, 130-b, and 130-c end their flight paths outside the coverage area of satellite 205-b in FIG. 2. This is shown in FIG. 3 where service windows $t_{SW}$[A:2] 310-a-2, $t_{SW}$[B:2] 310-b-2, and $t_{SW}$[C:2] 310-c-2 terminate before the end of service timeframe 305.

In similar examples, service availabilities 300-c and 300-d show the service windows 310 for which satellite beams 205-c and 205-d are candidate beams for aircraft 130-a, 130-b, and 130-c. Specifically, satellite beam 205-c is a candidate beam for aircraft 130-a, 130-c, and 130-d over service windows $t_{SW}$[A:3] 310-a-3, $t_{SW}$[B:3] 310-b-3, and $t_{SW}$[C:3] 310-c-3, respectively, and satellite beam 205-d is a candidate beam for aircraft 130-a, 130-c, and 130-d over service windows $t_{SW}$[A:4] 310-a-4, $t_{SW}$[B:4] 310-b-4, and $t_{SW}$[C:4] 310-c-4, respectively.

Thus, beam handover manager 125 may determine, for each aircraft 130 being provided service, service windows associated with each beam available to service the aircraft within the service timeframe 305. In addition, each of satellite beams 205 may provide service to a number of fixed terminals. Beam utilization due to service of fixed terminals may also be estimated over the service timeframe 305.

Figure 4A:
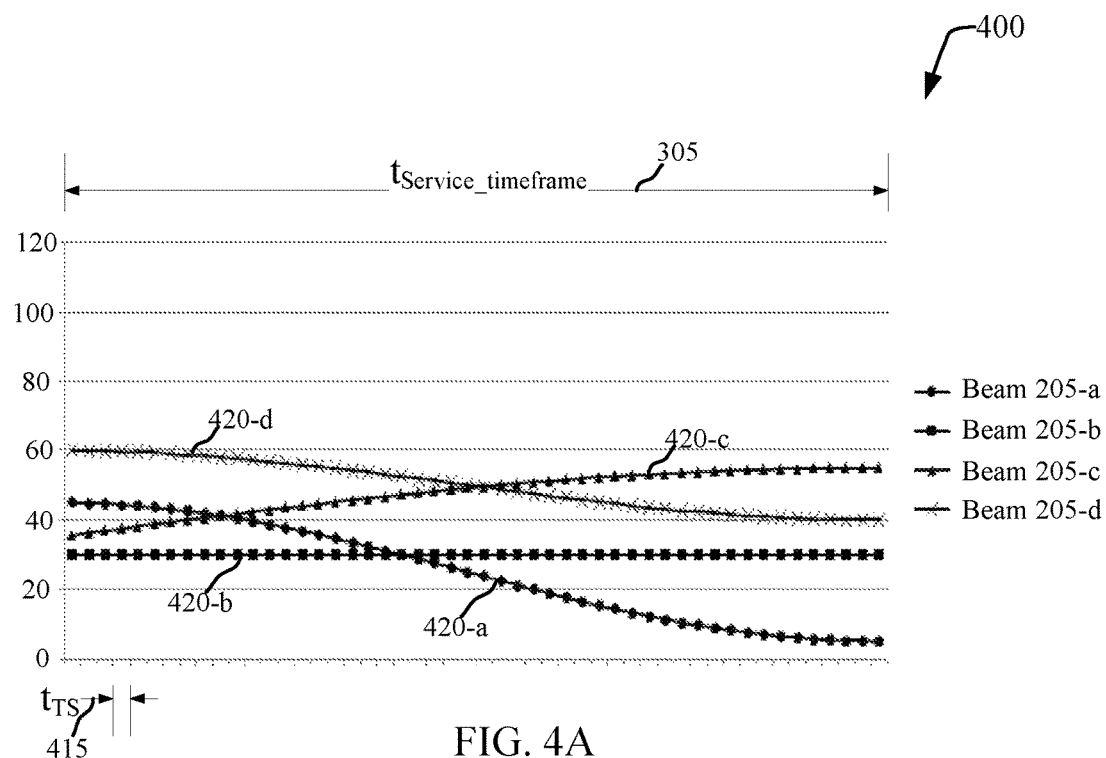
FIG. 4A illustrates an example of a chart of estimated beam utilization of satellite beams by various fixed terminals, in accordance with various aspects of the present disclosure.

FIG. 4A illustrates an example of a chart 400 of estimated beam utilization of satellite beams by various fixed terminals, in accordance with various aspects of the present disclosure. For example, chart 400 may illustrate beam utilization for satellite beams 205-*a*, 205-*b*, 205-*c*, and 205-*d* due to fixed terminals that are provided network service by the respective satellite beams 205. The estimated beam utilization depicted in chart 400 may be exclusive of the estimated network resource demands of any aircraft 130 that are within the coverage area of satellite beams 205. Since fixed terminals generally do not move from the coverage area of the satellite beam 205 currently servicing them, variation of network demand over the service timeframe 305 may occur due to a number of other factors including different network resource demands in different times of the day, different populations served by each satellite beam 205, etc. The estimated beam utilization over service timeframe 305 may be estimated for each of a plurality of time segments 415, which may be a time unit used for beam assignment decisions (e.g., the smallest time unit for handover decisions and scheduling, etc.).

The estimated beam utilization shown in chart 400 may be estimated based on current demand and historical demand data. For example, the beam utilization for fixed terminals shown in chart 400 shows that the fixed terminal estimated beam utilization 420-*d* for satellite beam 205-*d* is currently (e.g., at the beginning of service timeframe 305) highest. In addition, the fixed terminal estimated beam utilizations 420-*a* and 420-*d* for satellite beams 205-*a* and 205-*d*, respectively, are expected to decrease over the service timeframe 305, while the fixed terminal estimated beam utilization 420-*c* is expected to increase over the service timeframe 305 and the fixed terminal estimated beam utilization 420-*b* is expected to be substantially constant over the service timeframe 305. Chart 400 shows the fixed terminal estimated beam utilizations 420 for satellite beams 205-*a*, 205-*b*, 205-*c*, and 205-*d* on a normalized scale of 0-120, where 100 represents the maximum capacity of each of the satellite beams (which may be different for different beams).

In addition, beam handover manager 125 may determine a service utilization for each aircraft 130 over the service timeframe 305. The service utilization for each aircraft over the service timeframe 305 may be determined based on historical service utilization data, an estimated number of the passengers utilizing the network access service on each aircraft, a service level offered to the passengers utilizing the network access service on each aircraft, a predicted spectral efficiency of communication between the satellite and the aircraft for a given beam (e.g., spectral efficiency may vary based on location of the aircraft within a beam or atmospheric conditions, etc.), and the like.

Figure 4B:
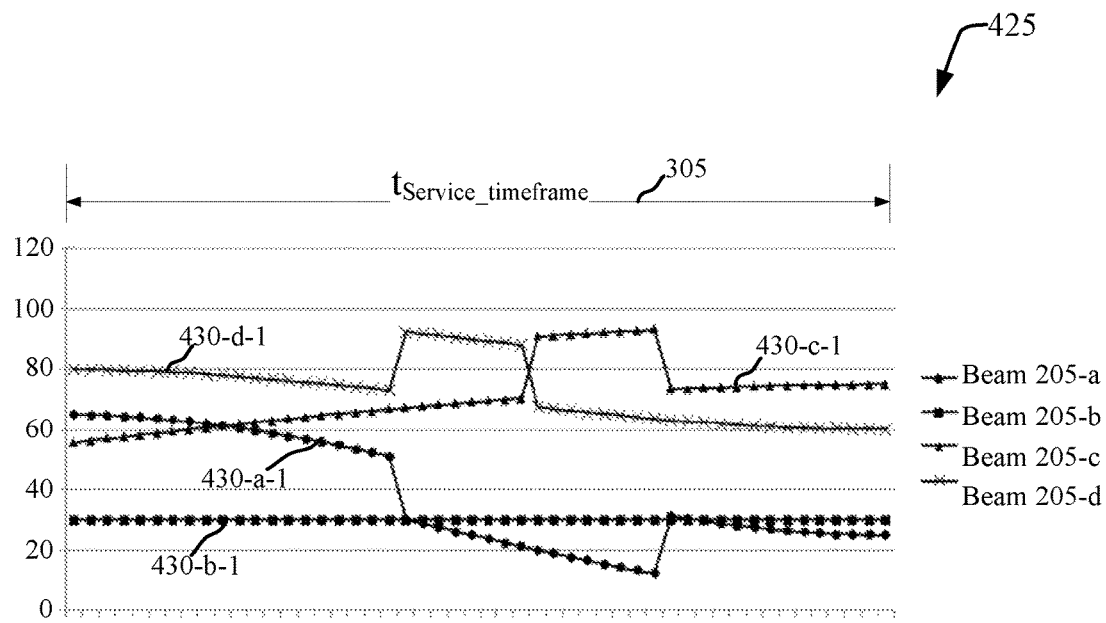
FIGS. 4B, 4C, and 4D illustrate a series of charts of expected beam resource utilization showing optimization iterations of assigning aircraft to candidate satellite beams over the service timeframe, in accordance with various aspects of the present disclosure.
Figure 4C:
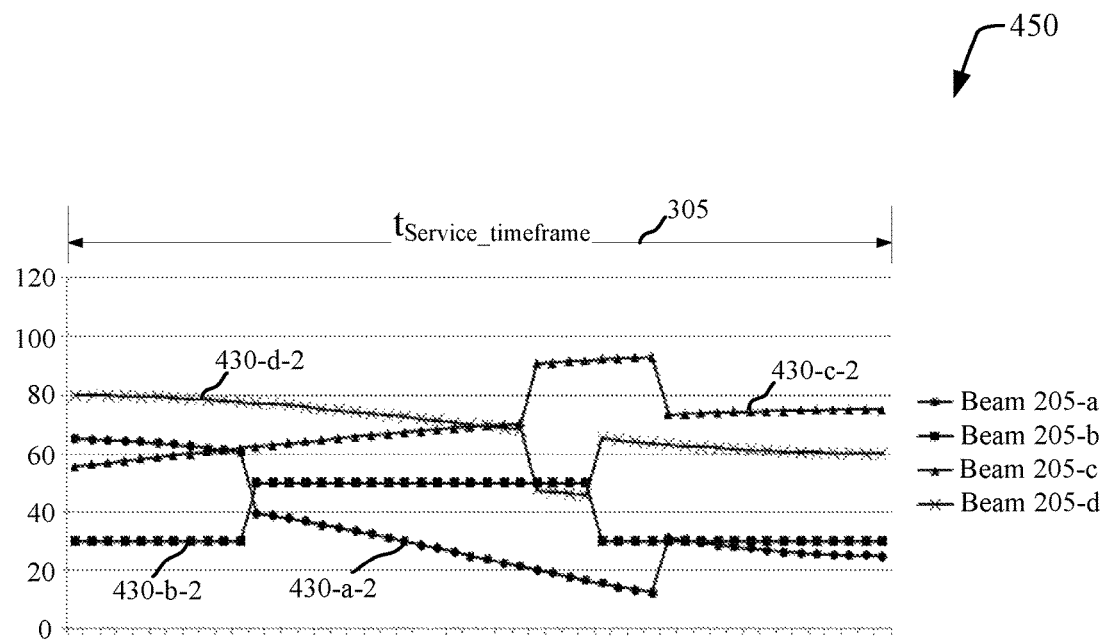
Figure 4D:
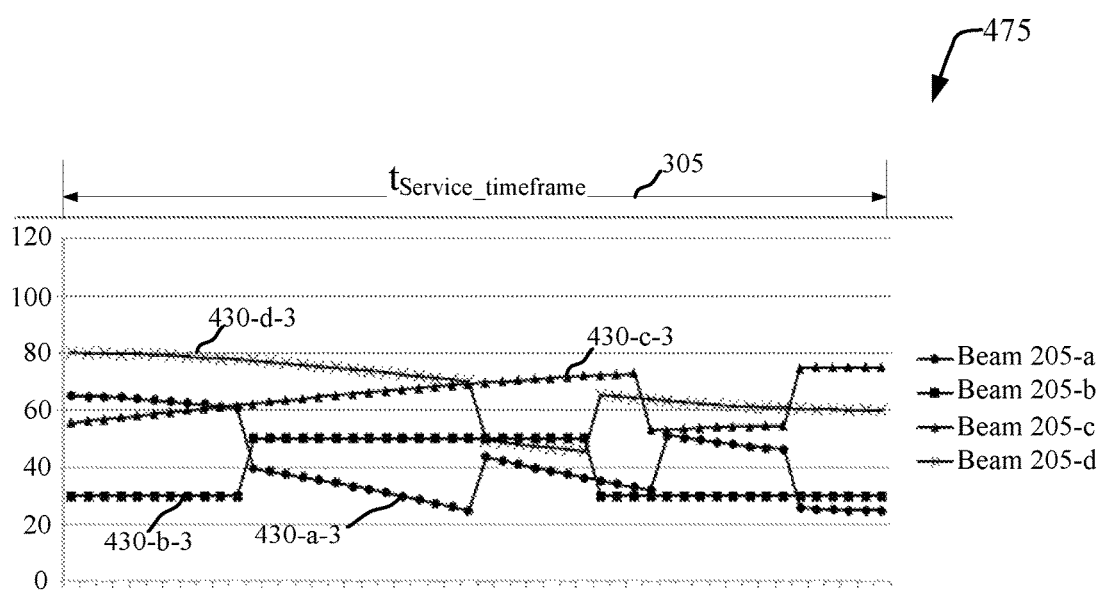

FIGS. 4B, 4C, and 4D illustrate a series of charts of expected beam resource utilization showing optimization iterations of assigning aircraft to candidate satellite beams over the service timeframe, in accordance with various aspects of the present disclosure. The optimization process may be performed by iteratively re-assigning one or more aircraft to different satellite beams until beam utilization scores for the satellite beams satisfy one or more beam utilization criteria. Beam utilization scores for each satellite beam may be, for example, normalized beam utilization as shown in FIGS. 4B-4D, or may be determined from the estimated beam utilization in other manners (e.g., filtered, etc.). The beam utilization criteria may include, for example, the beam utilization scores remaining below a threshold during the service timeframe, a maximum amount of time the beam utilization scores may exceed the threshold in the service timeframe, a maximum difference between a given beam utilization score and an average of the beam utilization scores for the plurality of satellite beams over the service timeframe, or a variance of the beam utilization scores for the plurality of satellite beams being below a variance threshold.

The optimization may include making a provisional selection of aircraft to candidate beams, determining beam utilization based on the provisional selection, and performing a number of iterations of re-assigning one or more aircraft to different beams until the beam utilization criteria are met. Selection of aircraft to re-assign for the optimization iterations may be performed according to re-assignment selection rules including selection of aircraft with the greatest beam flexibility, random selection, and the like. For example, if a given satellite beam does not meet one or more beam utilization criteria during a particular service timeframe, an aircraft for which the given satellite beam has been provisionally selected may have its provisional beam assignments changed for at least a part of the service timeframe. This process may continue until all the satellite beams meet the beam utilization criteria according to the provisional assignments. Alternatively, the optimization process may involve an optimization using a value function to find an optimal or near optimal beam assignment solution, as discussed in more detail below. Once the optimization process has concluded, the provisionally selected satellite beams may be adopted by beam handover manager 125 where for each of the aircraft the satellite beams are used according to the provisional selection. In another embodiment, the optimization process may obtain one or more satellite beam assignment sets for providing network access service to the aircraft. Each of the satellite beam assignment sets may have one or more satellite beams provisionally assigned for servicing each of the aircraft (e.g., successively) during a service timeframe. Each satellite beam of the satellite beam assignment sets may have a beam utilization score that meets the beam utilization criteria during the service timeframe. That is, multiple sets of provisional selections may be determined for which the beam utilization criteria are met. In some examples, additional criteria (e.g., total number of handovers, number of handovers for a given aircraft, etc.) may be applied to select between the multiple sets.

In the example charts in FIGS. 4B, 4C, and 4D, the service utilization for each aircraft 130 is estimated to be a constant value of 20 units over the service timeframe 305. However, this value is for the purposes of illustration and may not represent a typical normalized service utilization for one aircraft within a satellite communications system. In addition, the estimated service utilization for aircraft 130 may vary over the service timeframe 305.

The beam optimization process may be triggered by various conditions or events. The trigger may be periodic (e.g., optimization may be performed every time segment 415 or predetermined number of time segments 415, every service timeframe 305, etc.) or it may be location based (e.g., optimization may be performed when an aircraft is detected within a certain distance from an edge of a satellite beam currently serving the aircraft, entering into an overlapping region of multiple satellite beams, etc.). The trigger may also occur based on load-balancing criteria such as a beam utilization of a satellite beam exceeding a capacity threshold, a number of aircraft serviced by a satellite beam exceeding an aircraft threshold, a number of users of a satellite beam exceeding a user threshold, a change in capacity demand for one or more satellite beams exceeding a threshold, or a difference of beam utilization between two or more satellite beams (e.g., adjacent beams, beams within a region, etc.) exceeding a beam delta threshold. The trigger may also be set when there is a change in the flight plan data (e.g., aircraft entering or exiting the network), or if a service level of the network access service to an aircraft falls below a service threshold.

FIG. 4B illustrates a chart of estimated beam utilization 425 of satellite beams 205-*a*, 205-*b*, 205-*c*, and 205-*d*. Chart 425 may depict the expected beam resource utilization by the fixed terminals of chart 400 in addition to aircraft 130 prospectively serviced by satellite beams 205. Chart 425 may show the beam utilization scores 430 of satellite beams 205 through an initial assignment of aircraft 130 to satellite beams 205. The initial assignment of satellite beams 205 may be done according to default rules. The default rules may involve providing network service to an aircraft 130 by a satellite beam 205 that is currently providing service, or whose coverage area the aircraft 130 initially starts in at the beginning of the service window. If the aircraft 130 initially begins in the coverage area of multiple satellite beams 205, beam handover manager 125 may select a candidate satellite beam based on which candidate satellite beam may provide the aircraft 130 with the longest possible service. After the aircraft 130 leaves the coverage area of the selected satellite beam, beam handover manager 125 may choose another candidate satellite beam based on which candidate satellite beam may provide aircraft 130 the longest possible service. Additionally or alternatively, the default rules for initial assignment of candidate satellite beams may include other factors such as beam priority (e.g., highest capacity beams being selected first, beams from the same satellite given priority, etc.) or random selection. Where beams from the same satellite currently providing service to an aircraft are not available, the default rules may assign an aircraft to a different satellite for providing service. Where multiple satellites are available for providing service, the default rules can select the satellite according to priority rules (e.g., satellites using the same technology given preference, satellites from the same operator given preference, satellites providing similar link performance given priority, etc.).

Based on the flight paths depicted in service area 200 and the default rules described above, the initial assignment may have satellite beam 205-*c* initially providing network service to aircraft 130-*a*. When aircraft 130-*a* is predicted to leave satellite beam 205-*c*, the initial assignment may handover aircraft 130-*a* to satellite beam 205-*a* for network service. With regards to aircraft 130-*b*, it may be first provided network service by satellite beam 205-*a* and then by satellite beam 205-*d* when aircraft 130-*b* is predicted to leave the coverage area of satellite beam 205-*a*. Aircraft 130-*c* may start receiving network service from satellite beam 205-*d* at the beginning of the service window, but then is assigned to satellite beam 205-*c* when it is predicted to leave the coverage area of satellite beam 205-*d*.

FIG. 4B shows the beam utilization scores 430-*a*-1, 430-*b*-1, 430-*c*-1, and 430-*d*-1 for satellite beams 205-*a*, 205-*b*, 205-*c*, and 205-*d*, respectively, based on applying the default rules for assignment of aircraft to satellite beams. Based on the beam utilization scores 430, beam handover manager 125 may determine whether further optimizing of beam assignments is performed. In the example of FIG. 4B, the beam utilization scores 430 are illustrated as a normalized (e.g., to beam capacity) beam utilization for each time segment 415. In other examples, the beam utilization scores may be a single value. For example, a beam utilization score may be determined as an average of the beam utilization 430 over the service timeframe 305, a percentage of time that the beam utilization 430 is above a beam utilization threshold (e.g., 80% of the beam capacity), a peak value of the beam utilization 430, a weighted average of beam utilization (e.g., higher beam utilization values given exponentially more weight, values of the beam utilization closer to the current time given more weight, etc.), or combinations of these techniques. In some examples, beam handover manager 125 may utilize a comparative beam utilization score, where the beam utilization scores for each satellite beam are based on a difference between the beam utilization and an average beam utilization of all or a subset (e.g., neighboring beams, by region, etc.) of the satellite beams 205.

In the example shown in FIG. 4B, beam handover manager 125 may determine that satellite beam 205-*d* has a beam utilization score 430-*d*-1 that exceeds a predetermined threshold (e.g., 80% of the beam capacity) during the service window. Beam handover manager 125 may also determine that satellite beam 205-*c* also has a beam utilization score 430-*c*-1 that, although lower than the beam utilization score for beam 205-*d*, exceeds the predetermined threshold. The beam utilization threshold may be a predetermined value based on the function used to determine the beam utilization score. Due to the determination that at least one beam has a beam utilization score that does not meet beam utilization criteria, beam handover manger 125 may decide to re-select candidate satellite beams for one or more of aircraft 130-*a*, 130-*b*, or 130-*c*.

Based on the determination that satellite beam 205-*d* has the highest beam utilization score 430, beam handover manager 125 may identify an aircraft 130 assigned to satellite beam 205-*d* during at least a portion of the service timeframe 305 that can be assigned to another candidate satellite beam. In some examples, beam handover manager 125 may utilize a ranked list of the aircraft 130 in its reassignment decision, the ranked list being based on a beam flexibility metric associated with each of the aircraft 130. The beam flexibility metric may be based on the number of available satellite beams for each of the aircraft 130 during their service timeframes. Further details of the ranked list may be found in the description relating to FIG. 5 below.

FIG. 4C illustrates a chart 450 of estimated beam utilization of satellite beams 205-*a*, 205-*b*, 205-*c*, and 205-*d* after a first optimization iteration. Chart 450 may depict the beam utilization scores 430 of satellite beams 205 after beam handover manager 125 performs a first optimization iteration based on the determined beam utilization scores from chart 425.

For the first optimization iteration, beam handover manager 125 may identify aircraft 130-*b* as having the highest beam flexibility metric and may identify that aircraft 130-*b* can be re-assigned to satellite beam 205-*b* for at least a portion of the service timeframe 305. Chart 450 shows the beam utilization scores 430-*a*-2, 430-*b*-2, 430-*c*-2, 430-*d*-2 of candidate satellite beams 205-*a*, 205-*b*, 205-*c*, and 205-*d*, respectively, after aircraft 130-*b* has been re-assigned to satellite beam 205-*b* from satellite beam 205-*d* for at least a portion of the service timeframe 305. As can be seen, the resulting beam utilization score 430-*d*-2 of satellite beam 205-*d* has dropped compared to beam utilization score 430-*d*-1 of FIG. 4B during the service window for which it had been assigned to serve aircraft 130-*b*. However, beam handover manager 125 may now consider satellite beam 205-*c* as having a beam utilization score 430-*c*-2 that still exceeds the beam utilization threshold. Due to this, beam handover manger 125 may decide to re-select candidate satellite beams for one or more of aircraft 130-*a*, 130-*b*, or 130-*c*.

FIG. 4D illustrates a chart 475 of beam utilization scores of satellite beams 205-*a*, 205-*b*, 205-*c*, and 205-*d*. Chart 475 may depict the beam utilization scores of satellite beams 205 after beam handover manager performs a second optimization iteration based on the determined beam utilization scores from chart 450. Based on the determination that satellite beam 205-c has the highest beam utilization score from chart 450, beam handover manager 125 may identify an aircraft 130 previously assigned to satellite beam 205-c to another candidate satellite beam. Again, beam handover manager 125 may utilize a ranked list of the aircraft 130.

For this example, beam handover manager 125 may identify aircraft 130-c as having the highest beam flexibility metric and may identify that aircraft 130-c can be re-assigned to satellite beam 205-a for at least a portion of the service timeframe 305. As shown in FIG. 2, satellite beam 205-a may service aircraft 130-c even before aircraft 130-c exits the coverage area of satellite beam 205-d. Chart 475 shows the beam utilization scores 430-a-2, 430-b-2, 430-c-2, 430-d-2 of candidate satellite beams 205-a, 205-b, 205-c, and 205-d, respectively, after aircraft 130-c has been re-assigned to satellite beam 205-a for the service window of satellite beam 205-a for aircraft 130-c. As can be seen, the resulting beam utilization score 430-c-3 of satellite beam 205-c is reduced when compared to beam utilization score 430-c-2 shown in FIG. 4C and is now below the threshold throughout the service timeframe 305. Beam handover manager 125 may determine that the optimization process is complete based on the beam utilization scores 430 for all the satellite beams being below the beam utilization threshold over the service timeframe 305. If however, after the second optimization iteration, the beam utilization scores 430 for one or more satellite beams do not satisfy beam utilization criteria, the beam handover manager 125 may continue to perform additional iterations until the beam utilization criteria are satisfied. With the set of candidate satellite beams for successively providing the network service to aircraft 130 determined, beam handover manager 125 may schedule handovers of aircraft 130 during the service timeframe according to the respective sets of candidate satellite beams selected for providing service to each aircraft 130. Although reassignment of aircraft discussed in the examples given in FIGS. 4B-4D is performed over corresponding service windows (e.g., reassignment of aircraft 130-c to satellite beam 205-a in the second optimization iteration includes reassignment over the service window $t_{SW[C:1]}$), reassignment of an aircraft may be for a portion of a corresponding service window, in some cases.

Figure 5:
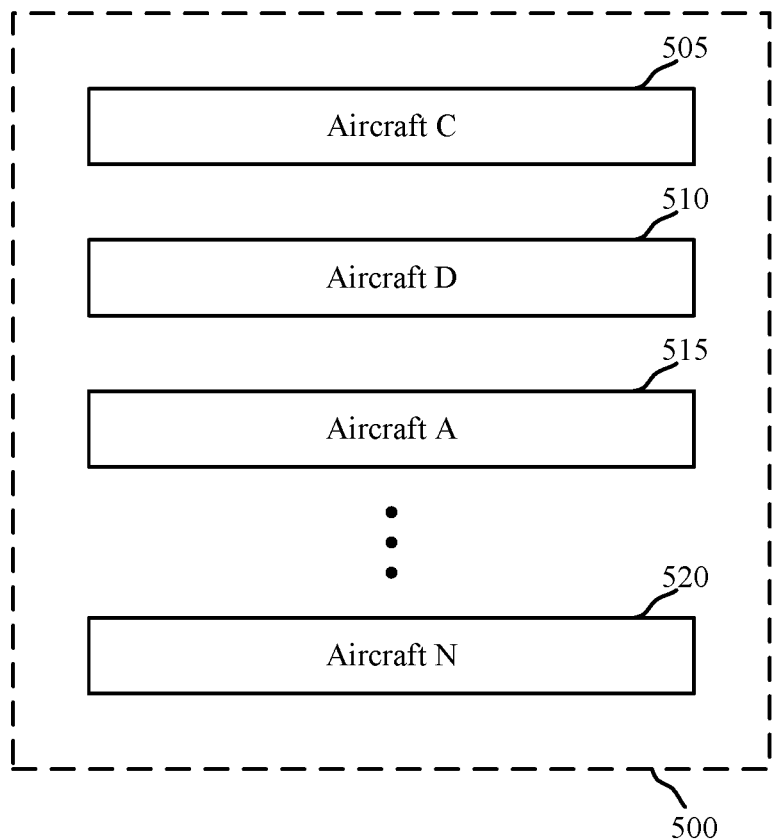
FIG. 5 is a block diagram illustrating an example of a ranked list of a plurality of aircraft based on a beam flexibility metric, in accordance with various aspects of the present disclosure.

FIG. 5 is a block diagram illustrating an example of a ranked list 500 of a plurality of aircraft 130 based on a beam flexibility metric. Ranked list 500 may illustrate a list constructed by beam handover manager 125 as shown in FIG. 1. Ranked list 500 may include the most flexible rank 505 (labeled "Aircraft C"), followed by rank 510 (labeled "Aircraft D"), and rank 515 (labeled "Aircraft A"). The ranked list 500 ends with the least flexible rank 520 (labeled "Aircraft N").

In the event that beam handover manager 125 optimizes beam utilization scores for a set of candidate satellite beams, beam handover manager 125 may utilize ranked list 500 for re-assigning aircraft to different satellite beams based on re-assignment flexibility of the aircraft. The optimization process was discussed in the description relating to FIGS. 4B, 4C, and 4D. In some examples, the aircraft with respective candidate satellite beams that possessed beam utilization scores that exceeded the threshold are identified by beam handover manager 125. With these aircraft, beam handover manager 125 may then create a ranked list 500 of the identified aircraft based on a beam flexibility metric associated with each of the identified aircraft. The beam flexibility metric may be based on the number of available satellite beams for the each of the identified aircraft during the associated service timeframe. For example, the beam flexibility metric may be determined based on an aggregate (e.g., median, average, etc.) of the number of beams available for each time segment 415, or the number of time segments having at least a certain number (e.g., two or more) available beams. In some examples, the beam flexibility metric is determined based on a set of time segments for which beam utilization of one or more candidate beams exceeds a threshold.

In FIG. 5, at least four aircraft have respective candidate satellite beams that possess beam utilization scores that exceed the threshold—aircraft A, aircraft C, aircraft D, and aircraft N. Beam handover manager 125 may then rank each aircraft based on their beam flexibility metric. Upon evaluating the aircraft's respective metrics, beam handover manager 125 ranks Aircraft C as being the most flexible (i.e., the most suitable to reassign a candidate satellite beam), while Aircraft N is the least flexible. In a circumstance where candidate satellite beams must be re-selected for one or more aircraft, beam handover manager 125 may begin the re-selection process with Aircraft C because it has the most flexibility for beam reassignment in ranked list 500. In some examples, beam handover manager 125 may factor in additional considerations in creating ranked list 500, including number of handovers for each aircraft. Thus, beam handover manager 500 may choose to bypass reselecting a candidate satellite beam for Aircraft C because a re-selection scenario involving a lower ranked aircraft may provide for a better outcome. Beam handover manager 125 may choose one or more aircraft from the ranked list in order to perform the reselection process.

Figure 6:
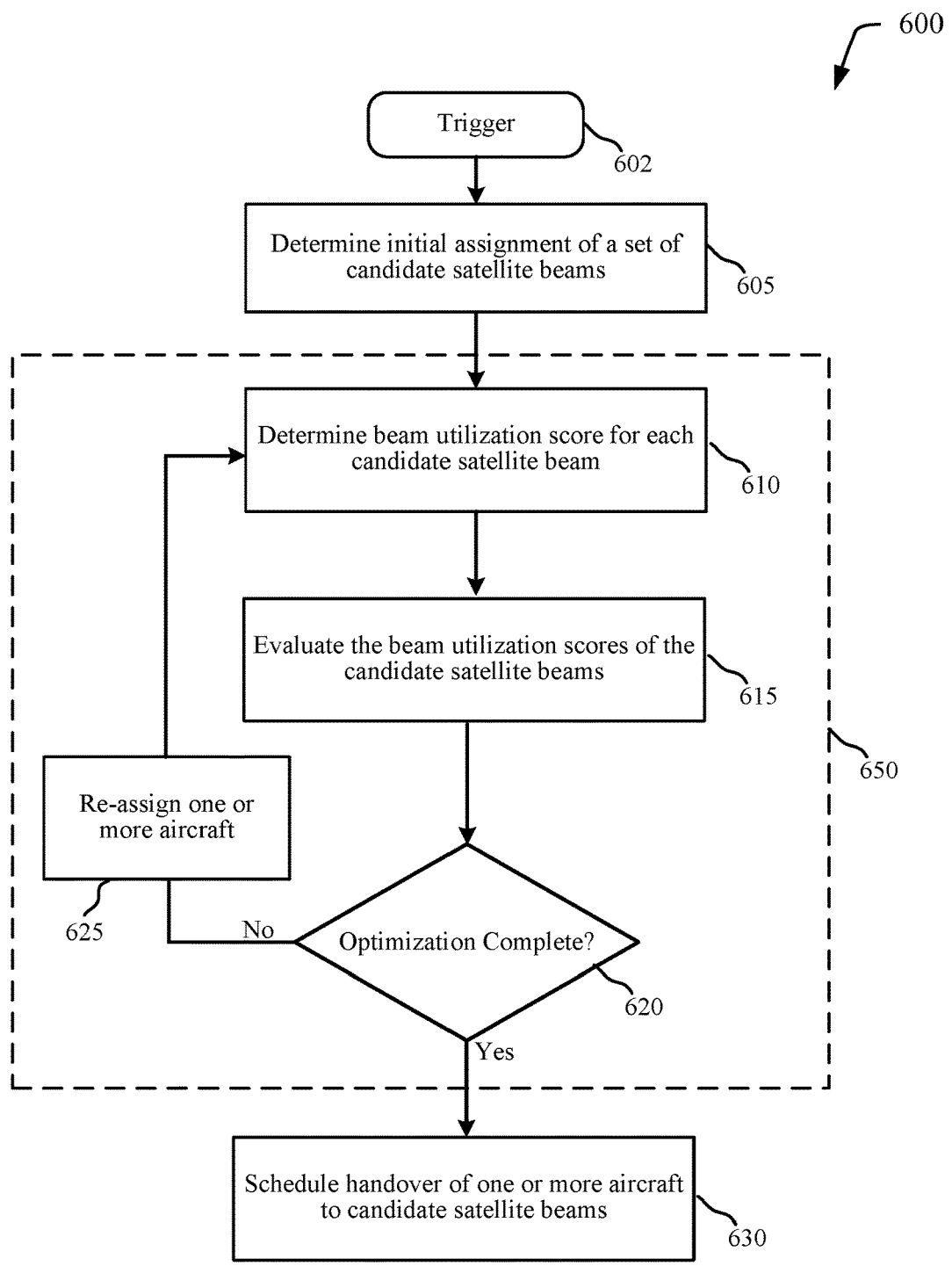
FIG. 6 is a flowchart diagram for managing satellite beam handover based on predicted network conditions, in accordance with various aspects of the present disclosure.

FIG. 6 is a flowchart diagram of an example method 600 for managing satellite beam handover based on predicted network conditions. Method 600 may be performed, for example, by the beam handover manager 125 of FIGS. 1, 7, and 8 for a satellite communications system 100 servicing a number of aircraft and fixed terminals via one or more multi-beam satellites. The method 600 begins at a trigger 602, which may be a triggering event or condition as described above.

At block 605, beam handover manager 125 may determine an initial assignment of aircraft to candidate satellite beams over a service timeframe. The service timeframe may begin at the time at which the optimization process is triggered (e.g., the current time of the optimization), and extend over a time period that may be predetermined or may be dynamically determined based on availability or predicted accuracy of flight plan data for aircraft served by the satellite communications system. The candidate satellite beams may be satellite beams 205 of one or more multi-beam satellites that may provide network access service to aircraft 130 within the service area of the satellite communications system. The satellite beams 205 may also provide network access service to a number of fixed terminals within the service area. The initial assignment of satellite beams 205 may be done according to default rules as described above.

Beam handover manager 125 may then perform a beam selection optimization sub-process 650. Beam selection optimization sub-process 650 may be used to traverse a search tree, where each beam selection node on the tree may be understood as a set of beam assignments for successively (e.g., continuously or as close as is possible given satellite beam coverage, etc.) providing service to each aircraft over the service timeframe.

At block 610 of beam utilization optimization sub-process 650, beam handover manager 125 determines beam utilization scores for each candidate satellite beam based on the current set of beam assignments (e.g., the initial assignments for the first optimization pass). For example, the beam handover manager 125 may determine the beam utilization for each beam over the service timeframe, and the beam utilization scores may be determined as a function of the beam utilization (e.g., average, weighted average, peak beam utilization, time beam utilization is above a threshold, filtered, normalized, etc.) over the service timeframe. Additionally, beam handover manager 125 may consider other optimization metrics. For example, beam handover manager 125 may assign an optimization cost to handovers encountered by an aircraft 130. Because a satellite beam handover of an aircraft from being served by one satellite beam to another is accompanied by the use of a certain amount of system resources and overhead, increases in the number of handovers may actually decrease overall system performance. In addition, handovers may cause temporary service disruption for users that may impact the user experience. Thus, the optimization cost for handovers may take into account the overall cost of handovers to system performance and user experience impact.

At block 615, beam handover manager 125 evaluates the beam utilization score for each candidate satellite beam. The evaluation may involve beam handover manager 125 determining if the beam utilization scores satisfy a beam utilization criteria. The beam utilization criteria may vary from embodiment to embodiment. For example, the beam utilization criteria may involve the beam utilization scores of every satellite beam being below a threshold. In another example, the criteria may involve a relative metric for the beam utilization scores (e.g., a differential between neighboring beams or beams within a region to be below a threshold, etc.). Additionally, the provisional selections may also be evaluated according to handover criteria. For example, solutions may be prioritized based on a total number of handovers of the aircraft 130 being served by the satellite communications system (e.g., preference is given to solutions achieving the beam utilization criteria with a lower total number of handovers, etc.). Additionally or alternatively, the handover criteria may include a maximum number of handovers or a minimum time between handovers for a given aircraft within the service timeframe, or give priority to solutions having a lower maximum number of handovers for any one aircraft 130. In addition, the criteria may include aircraft location criteria such as predicted location of aircraft within the satellite beams within the service timeframe. For example, solutions with fewer aircraft towards the edge of satellite beams for longer periods of time may be ranked higher than solutions with more aircraft in beam edge regions. In some examples, satellite beams may have cost metrics assigned based on a cost to utilize the beams, and the criteria may account for the cost metrics in evaluation of solutions.

At decision block 620, beam handover manager 125 determines if the set of candidate satellite beams is able to provide network access service to aircraft 130 while meeting the beam utilization criteria. If the set of candidate satellite beams meets the beam utilization criteria, then method 600 proceeds to block 630 where beam handover manager 125 schedules the handover of aircraft 130 to their respective determined candidate satellite beams for the future service window. If the set of candidate satellite beams does not meet the beam utilization criteria, the method proceeds to block 625.

At block 625, beam handover manager 125 re-assigns one or more aircraft to different candidate satellite beams for at least a portion of the service timeframe in order to optimize the beam utilization scores of the satellite beams. Beam handover manager 125 may utilize a variety of optimization techniques that may vary from embodiment to embodiment. For example, beam handover manager 125 may randomly assign one or more aircraft 130 to different candidate satellite beams than they are currently assigned. In another example, beam handover manager 125 may choose the candidate satellite beam possessing the highest beam utilization score and re-assign or one or more aircraft 130 served by that beam during the service timeframe to a different beam. In determining the one or more aircraft 130 to assign to different candidate satellite beams, beam handover manager 125 may utilize a ranked list of the one or more aircraft 130 based on each aircraft's beam flexibility metric as discussed above. In yet another technique, beam handover manager 125 may re-assign candidate satellite beams or aircraft 130 based on re-assignments that minimize handovers. Thus if re-assigning fewer aircraft, or performing re-assignments that do not increase the number of handovers is an option, beam handover manager 125 may prioritize that consideration over other factors during the optimization process.

Upon re-assigning the set of candidate satellite beams in block 625, method 600 reverts back to block 610 where beam handover manager 125 assigns a beam utilization score to each candidate satellite beam as described above. After evaluating the beam utilization scores at block 615, beam handover manager 125 again determines if the optimized set of candidate satellite beams will provide network service to each aircraft while meeting the beam utilization criteria. If it will not, method 600 proceeds to block 625 for another optimization iteration. If it will, method 600 ends at block 630 with beam handover manager 125 scheduling the handovers associated with the optimized set of beam assignments.

As described for blocks 610, 615, 620 and 625, the beam selection optimization sub-process 650 is performed using beam re-assignment rules at block 625 (e.g., rules for re-assigning aircraft to different beams) and beam utilization criteria at block 620 for determining the final beam assignments. Techniques using iterative re-assignment that start from an initial assignment (e.g., based on default rules or current assignments, etc.) and then stop searching once the criteria (e.g., beam utilization criteria, handover criteria, aircraft location criteria, etc.) are met may find a solution that meets the criteria with a minimum number of changes to the current assignments. However, these techniques may also fail to find a solution meeting the criteria, or find a solution that is sub-optimal over the entire solution space. Other optimization techniques may also be used in addition or as an alternative for finding optimal or near-optimal beam assignment solutions. For example, if the beam utilization optimization sub-process 650 fails to find a solution in a given number of iterations using beam re-assignment according to beam flexibility metrics, techniques such as a random re-assignment of one or more aircraft to different beams may be employed to provide a wider scope of solutions sets.

Optimization techniques for finding optimal or near-optimal solutions may optimize a value function that takes into account the beam utilization scores for the candidate satellite beams and other optimization metrics. For example, the value function may incorporate the beam utilization scores (e.g., evaluated for the effect of beam utilization to service impact, etc.), beam utilization over the service timeframe, number and/or frequency of handovers, and cost of utilization of particular beams as cost metrics of the value function. The value function may take into account predicted service utilization of each aircraft as it traverses each candidate beam. For example, the expected data rate over the service timeframe may be estimated for each aircraft, and the service utilization may take into account an expected spectral efficiency of communication between the satellite and the aircraft as it traverses a given beam (e.g., spectral efficiency may be higher at the center of the beam or may be impacted by predicted atmospheric conditions).

In some examples, Monte Carlo tree search may be used to traverse beam selection paths between beam selection nodes. The Monte Carlo tree search may use random or semi-random expansion rules to choose child beam selection nodes from a given beam selection node, and may use back-propagation to expand from different beam selection nodes based on the updated beam utilization scores at each beam selection node. Additionally or alternatively, branch and bound techniques for pruning the search tree of beam selection nodes may be used including minimax pruning, naïve minimax pruning, or alpha-beta pruning.

In some examples, beam optimization sub-process 650 may use combinatorial optimization techniques such as dynamic programming to compute the optimal or near-optimal (e.g., based on maximizing the value function) beam selection for each aircraft over the service timeframe. In one example, the assignment of aircraft within the satellite communications system may be modeled as a generalized assignment problem with knapsack constraints (e.g., applying system constraints such as beam bandwidth, etc.). The dynamic programming techniques may evaluate multiple beam assignment hypotheses over the service timeframe to determine the optimal or near optimal beam assignments according to the value function. In some examples, approximate programming techniques may be used to reduce computational complexity. For example, approximations (e.g., rounding, truncating precision, etc.) in beam utilization scores, handover costs, and the like may be employed to bound the solution space. In some examples, uncertainty in inputs such as the flight plan data, estimates of beam utilization due to fixed terminals, estimates of service utilization for each aircraft, and the like, may be taken into account using stochastic optimization techniques.

Figure 7:
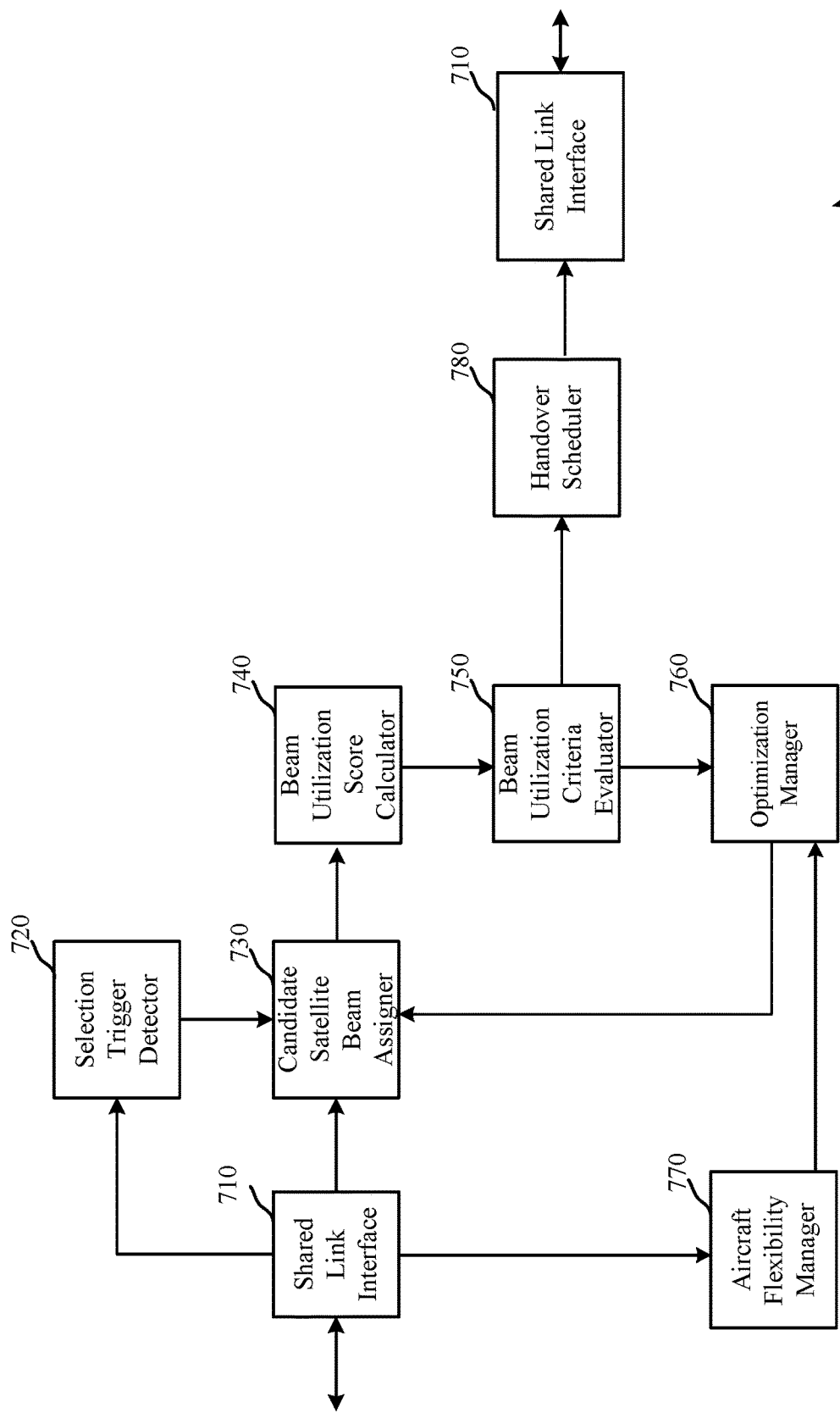
FIG. 7 is a block diagram illustrating an example of a beam handover manager for satellite beam handover based on predicted network conditions, in accordance with various aspects of the present disclosure.

FIG. 7 is a block diagram illustrating an example of a beam handover manager 125-a for satellite beam handover based on predicted network conditions, in accordance with various aspects of the present disclosure. The beam handover manager 125-a may be an example of the beam handover manager 125 described with reference to FIG. 1. The beam handover manager 125-a may include a shared link interface 710, selection trigger detector 720, candidate satellite beam assigner 730, beam utilization score calculator 740, beam utilization criteria evaluator 750, optimization manager 760, aircraft flexibility manager 770, and handover scheduler 780. Each of these components may be communicatively coupled to each other.

Shared link interface 710 may receive information such as flight plan data, flight status data, network resource data, satellite data, etc. Shared link interface 710 may also forward beam handover data received from handover scheduler 780. Shared link interface 710 may forward some or all of this data to selection trigger detector 720, candidate satellite beam assigner 730, and aircraft flexibility manager 770. Selection trigger detector 720 may send a trigger to candidate satellite beam assigner 730 to select satellite beams for providing network access service to one or more aircraft 130 over a service timeframe. The instances that cause selection trigger detector 720 to send a trigger may be periodic or may happen under circumstances that are described above (e.g., an aircraft being within a certain distance of a beam edge, an aircraft entering a new beam, beam utilization of a beam exceeding a threshold, a number of aircraft serviced by a satellite beam exceeding an aircraft threshold, a number of users of a satellite beam exceeding a user threshold, a difference of beam utilization between two or more satellite beams exceed a beam delta threshold, etc.).

Candidate satellite beam assigner 730 may first provisionally assign aircraft 130 to candidate satellite beams based on default rules. Beam utilization score calculator 740 may calculate a beam utilization score for each candidate satellite beam determined by candidate satellite beam assigner 730. The beam utilization score may be determined by a variety of factors as described above. Beam utilization criteria evaluator 750 may evaluate whether one or more beam utilization scores determined by beam utilization score calculator 740 meets one or more beam utilization criteria as described above. The criteria may include a predetermined beam utilization threshold where beam utilization criteria evaluator 750 determines if one or more beam utilization scores exceed the predetermined threshold. The determination may occur over a portion or the entirety of a service timeframe.

Optimization manager 760 may apply a number of optimization techniques towards the assigned set of candidate satellite beams in the instance where the beam utilization criteria evaluator 750 determines that the set of candidate satellite beams fails to meet the beam utilization criteria. One technique may include randomly assigning one or more aircraft 130 to different candidate satellite beams than they were assigned in the initial assignment. In another technique, optimization manager may receive aircraft flexibility information from aircraft flexibility manager 770 that indicates which aircraft associated with a satellite beam has the highest flexibility in being assigned to another candidate satellite beam. Once an optimization technique has been applied, candidate satellite beam assigner 730 may receive the resulting information. Additionally or alternatively, optimization manager 760 may employ optimization techniques using a value function as described above including Monte Carlo tree search, branch and bound techniques, or dynamic programming.

Handover scheduler 780 may schedule handovers of each aircraft to a selected set of candidate satellite beams during the service timeframe based on the determinations for beam utilization criteria of beam utilization criteria evaluator 750 or optimization results of optimization manager 760.

Figure 8:
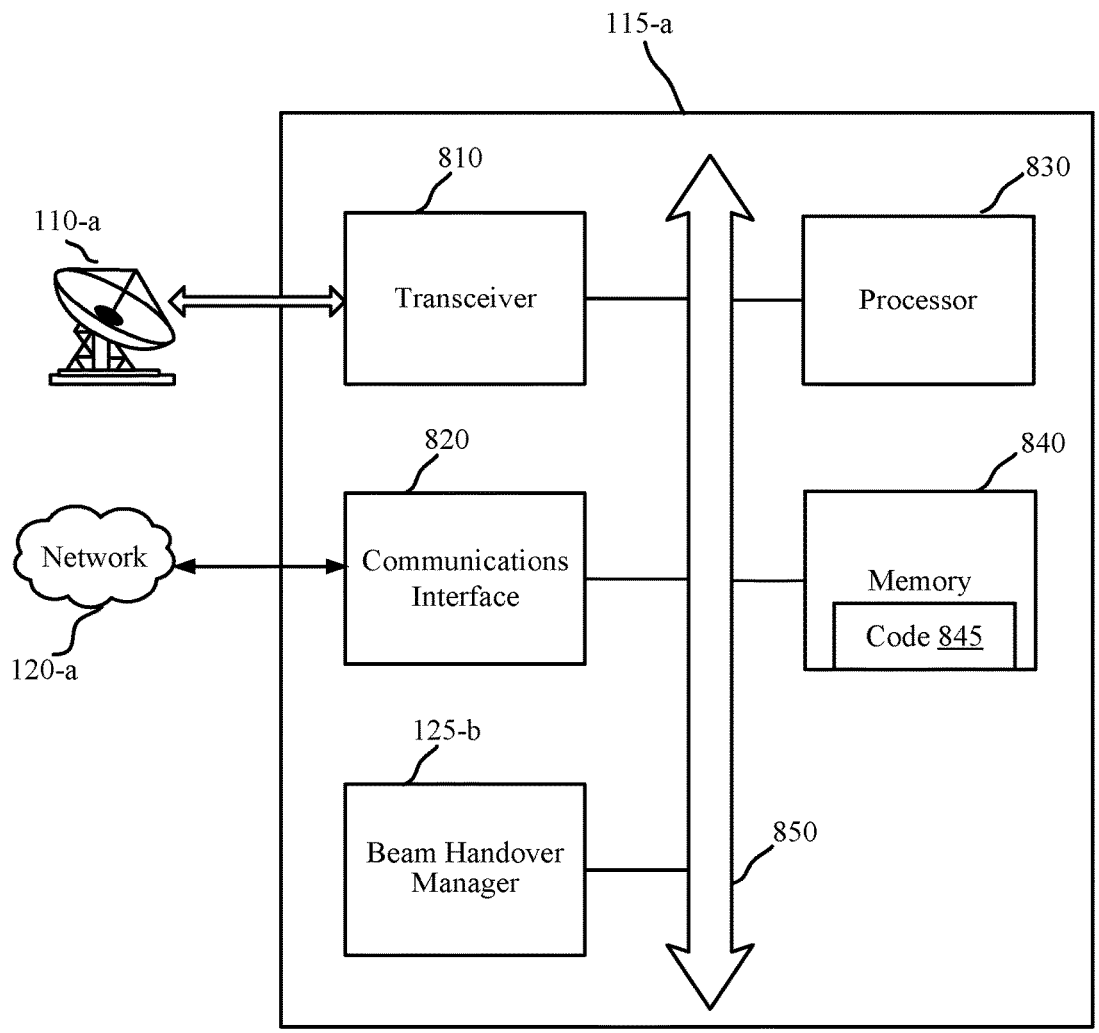
FIG. 8 is a block diagram illustrating an example of a gateway for satellite beam handover based on predicted network conditions, in accordance with various aspects of the present disclosure.

FIG. 8 is a block diagram illustrating an example of a gateway 115-a for satellite beam handover based on predicted network conditions, in accordance with various aspects of the present disclosure. The gateway 115-a may be an example of the gateway 115 described with reference to FIG. 1. The gateway 115-a may include a transceiver 810, communications interface 820, beam handover manager 125-b, processor 830, memory 840, software code 845, and bus 850.

Transceiver 810 manages communications between the multi-user access terminal 170-b and satellite(s) 105 via ground station antenna system 110-a. The transceiver 810 may communicate bi-directionally, via one or more antennas, as described above. The transceiver 810 may also include a modem to modulate the packets and provide the modulated packets to the antennas for transmission, and to demodulate packets received from the antennas. In some examples, a transmitter may be collocated with a receiver in the transceiver 810. Transceiver 810 may be configured to communicate with satellite(s) 105 over one or more frequency bands (e.g., Ka, Ku, etc.) and may be configured to automatically orient antenna 110-*a* to transmit signals to and receive signals from satellite(s) 105.

Communications interface module 820 controls network traffic to and from network 120-*a*. Communications interface 820 may implement wired network interfaces (e.g., Ethernet, Fibre Channel, etc.) and/or wireless network interfaces (e.g., IEEE 802.11 compliant interfaces, etc.).

Processor 830 may include an intelligent hardware device, e.g., a central processing unit (CPU), a microcontroller, an ASIC, etc. Processor 830 may process information received through modem 810 or communications interface 820, or information to be sent to communications interface 820 or modem 810 for transmission. Processor 830 may handle, alone or in connection with gateway 115-*a*, various aspects of allocating satellite capacity based on aircraft load forecasting.

Memory 840 may include random access memory (RAM) or read-only memory (ROM). Memory 840 may store computer-readable, computer-executable code 845 containing instructions that are configured to, when executed, cause processor 830 to perform various functions described herein. Alternatively, the code 845 may not be directly executable by processor 830 but be configured to cause the gateway 115-*a* (e.g., when compiled and executed) to perform various of the functions described herein.

Beam handover manager 125-*b* may, in conjunction with memory 840 and processor 830, perform the functions described above including performing satellite beam handover based on predicted network conditions. For example, beam handover manager 125-*b* may calculate beam utilization scores of candidate satellite beams for providing network service for aircraft over one or more service timeframes based on predicted beam utilization. Based on the beam utilization scores, beam handover manager 125-*b* may select satellite beams to provide network service for each aircraft. Beam handover manager 125-*b* may then schedule a handover of network service for each aircraft to the selected satellite beams and may subsequently reselect satellite beams for certain aircraft based on changing network conditions.

The components of the gateway 115-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 9:
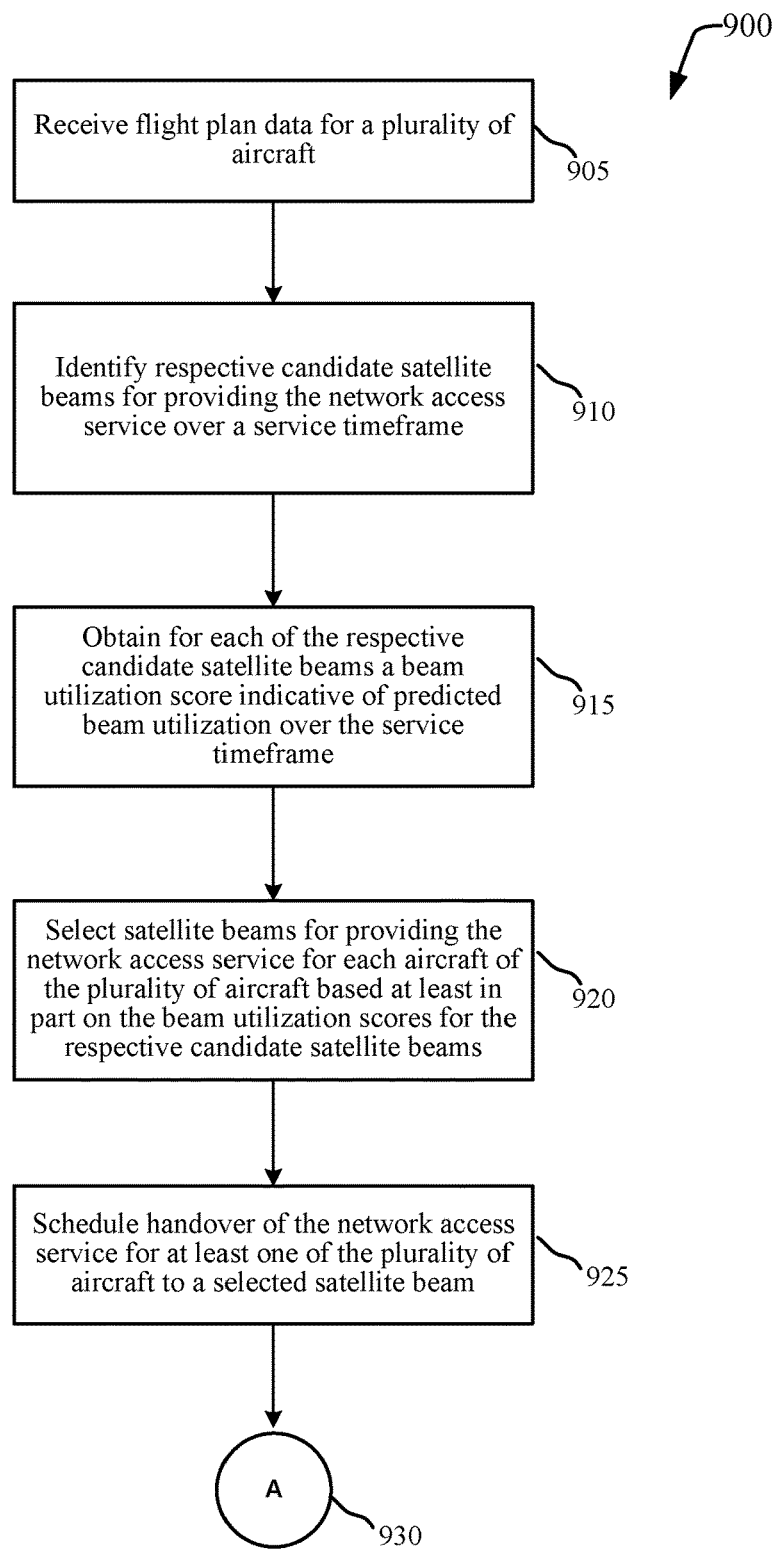
FIGS. 9 and 10 are flowchart diagrams of example methods for performing satellite beam handover based on predicted network conditions.

FIG. 9 is a flowchart diagram of an example method 900 for performing satellite beam handover based on predicted network conditions. Method 900 may be performed, for example, by the beam handover manager 125 of FIGS. 1, 7, and 8.

At block 905 of method 900, beam handover manager 125 receives flight plan data for one or more aircraft that are provided network access service via the multi-beam satellite system and forecasts travel paths for the one or more aircraft. Beam handover manager 125 may receive this flight plan data via network 120 or it may receive the data from the aircraft 130 (e.g., via satellite 105).

With the flight plan data, beam handover manager 125 identifies, for each aircraft 130, respective candidate satellite beams for providing the network access service (e.g., successively) over a service timeframe at block 910. At block 915, beam handover manager 125 may obtain, for each of the satellite beams for a service timeframe, a beam utilization score indicative of predicted beam utilization over the service timeframe. The beam utilization score of each candidate satellite beam may be based on a plurality of beam utilization factors comprising one or more of empirical beam utilization data, a number of fixed terminals serviced by each of the plurality of satellite beams, provisioned service levels for the fixed terminals, historical beam utilization data, an estimated number of the passengers utilizing the network access service on each aircraft, a service level offered to the passengers utilizing the network access service on each aircraft. The beam utilization scores may also be a weighted sum of the plurality of beam utilization factors.

At block 920 beam handover manager 125 selects, over the service timeframe, satellite beams for providing the network access service for each aircraft of the plurality of aircraft based in part on the beam utilization scores for the respective candidate satellite beams. In some examples, the selecting may be based on an estimated service utilization associated with each aircraft relative to the beam utilization scores for the respective candidate satellite beams. In some examples, the selecting may be based on a cost of utilization of each of the respective candidate satellite beams, minimizing a number of satellite beam handovers for the plurality of aircraft, minimizing handovers to a satellite beam of a satellite different from the satellite currently serving an aircraft, or a combination thereof. In some examples, the selecting may be based on receiving a handover evaluation trigger where the trigger may be one or more of a periodic trigger, detecting an aircraft within a certain distance from an edge of a satellite beam currently serving the aircraft, detecting an aircraft entering into an overlapping region of multiple satellite beams, beam utilization of a satellite beam of the plurality of satellite beams exceeding a capacity threshold, a number of aircraft serviced by a satellite beam of the plurality of satellite beams exceeding an aircraft threshold, a number of users of a satellite beam of the plurality of satellite beams exceeding a user threshold, a change in the flight plan data, detecting a difference of beam utilization between two or more satellite beams exceeding a beam delta threshold, or a service level of the network access service to an aircraft falling below a service threshold.

Method 900 then proceeds to block 925, where beam handover manager 125 schedules at least one handover for at least one of the plurality of aircraft to a selected satellite beam during the service timeframe. At block 930, method 900 may continue to another example that will be described in FIG. 10.

Figure 10:
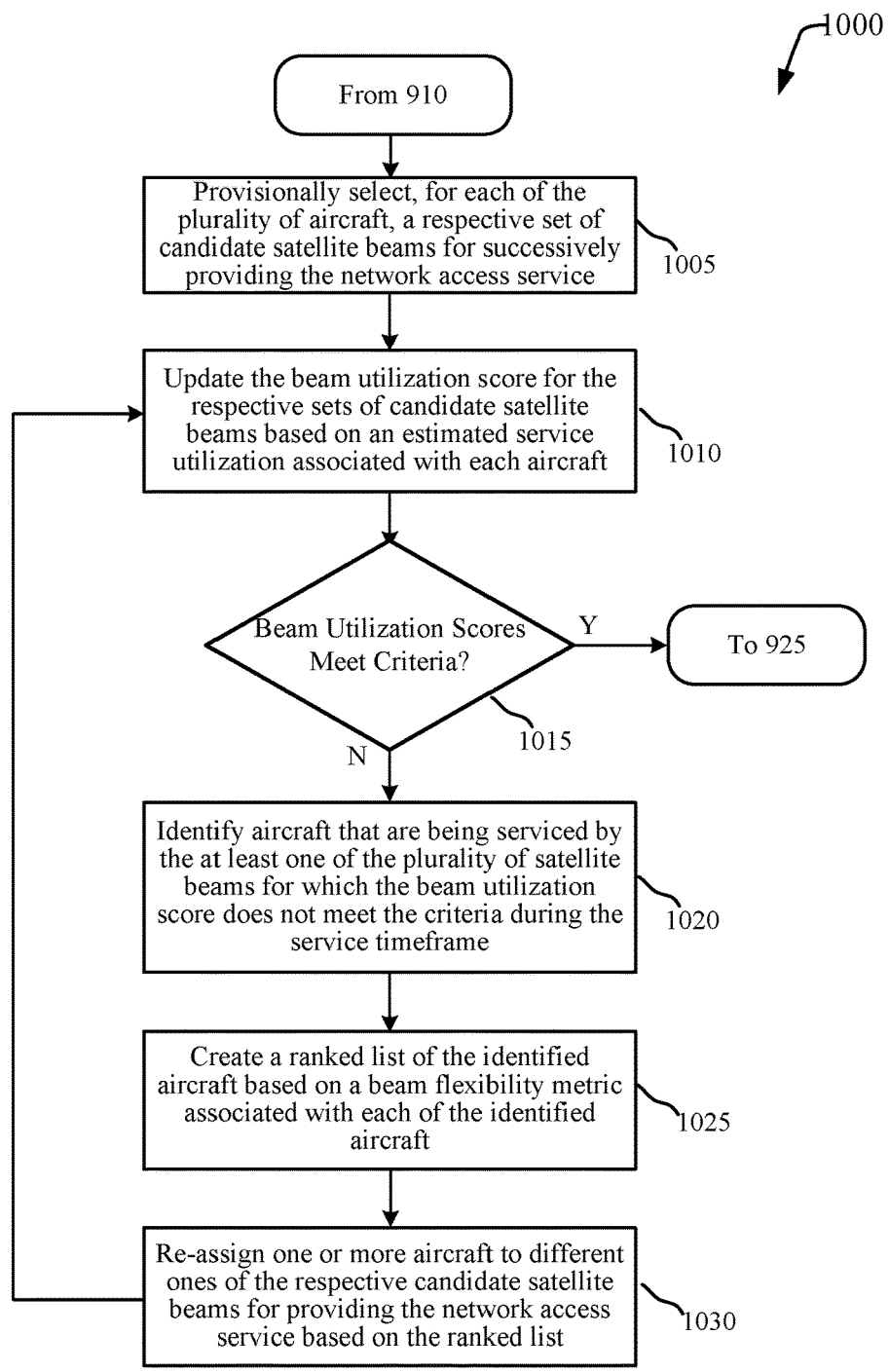

FIG. 10 is a flowchart diagram of an example method 1000 for performing satellite beam handover based on predicted network conditions. Method 1000 may be an example method for implementing aspects of method 900. Method 1000 may be performed, for example, by the beam handover manager 125 of FIGS. 1, 7, and 8.

Method 1000 may after block 910 of FIG. 9, where respective candidate satellite beams for providing network access service to a plurality of aircraft have been identified. At block 1005, beam handover manager 125 provisionally selects, for each of the plurality of aircraft, a respective set of candidate satellite beams for providing the network access service during the service timeframe. The provisional selections may be based, for example, on default rules for beam assignment. With the provisional selections of the candidate satellite beams, beam handover manager 125 updates the beam utilization score for the respective sets of candidate satellite beams based on an estimated service utilization of each beam associated with each aircraft during the service timeframe at block 1010. At block 1015, beam handover manager 125 determines whether a beam utilization score for at least one of the plurality of satellite beams does not meet a beam utilization criteria during the service timeframe. If, at block 1015, beam handover manager 125 determines that the satellite beams have beam utilization scores that meet a beam utilization criteria during the service timeframe, method 1000 terminates and returns to block 925 for scheduling of handovers during the service timeframe based on the beam assignments. If, at block 1015, beam handover manager 125 determines that at least one satellite beam has a beam utilization score that does not meet a beam utilization criteria during the service timeframe, method 1000 proceeds to block 1020.

At block 1020, beam handover manager 125 identifies aircraft that are being serviced by the at least one of the plurality of satellite beams for which the beam utilization score does not meet a beam utilization criteria during the service timeframe. For the identified aircraft, beam handover manager 125 may exchange the satellite beams having beam utilization scores that do not meet the beam utilization criteria for substitute satellite beams. In one example, beam handover manager 125 creates a ranked list of the identified aircraft based on a beam flexibility metric associated with each of the identified aircraft at block 1025. The beam flexibility metric may be based on the number of available satellite beams for the each of the identified aircraft during the associated service timeframe. Utilizing the ranked list, beam handover manager 125 re-selects a different one of the respective candidate satellite beams for providing the network access service at block 1030. Method 1000 then returns to block 1010 to update the beam utilization scores for the candidate satellite beams based on the re-assignments of aircraft to candidate satellite beams at block 1030.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for satellite beam handover management for aircraft in a satellite communication system comprising a plurality of satellite beams, the method comprising:
retrieving flight plan data for a plurality of aircraft being provided a network access service for passengers via the satellite communication system;
identifying, for each aircraft of the plurality of aircraft based at least in part on the flight plan data, respective candidate satellite beams of the plurality of satellite beams for providing the network access service over a service timeframe;
obtaining, for the plurality of satellite beams for the service timeframe, a beam utilization score indicative of predicted beam utilization over the service timeframe;
selecting, over the service timeframe, satellite beams for providing the network access service for each aircraft of the plurality of aircraft based at least in part on the beam utilization scores for the respective candidate satellite beams; and
scheduling at least one handover for at least one of the plurality of aircraft to a selected satellite beam during the service timeframe.

2. The method of claim 1, wherein the obtaining and the selecting comprise:
provisionally selecting, for each of the plurality of aircraft, one or more of the candidate satellite beams for providing the network access service during the service timeframe;
acquiring the beam utilization scores for the plurality of satellite beams during the service timeframe according to the provisional selection of the one or more of the candidate satellite beams for the each of the plurality of aircraft; and
adopting the provisionally selected one or more of the candidate satellite beams for the each of the plurality of aircraft upon determining that the beam utilization scores for the plurality of satellite beams meet beam utilization criteria for the service timeframe.

3. The method of claim 2, wherein for each of the plurality of aircraft, the one or more of the candidate satellite beams are used successively over the service timeframe.

4. The method of claim 2, further comprising:
iteratively performing the provisionally selecting and acquiring until the beam utilization scores for the plurality of satellite beams meet the beam utilization criteria for the service timeframe, wherein, for each iteration, the provisionally selecting comprises:
exchanging, for a first aircraft having a provisionally selected satellite beam having a beam utilization score that does not meet the beam utilization criteria for the service timeframe, the provisionally selected satellite beam for a substitute satellite beam for at least a portion of the service timeframe.

5. The method of claim 4, wherein, for each iteration, the exchanging comprises:

identifying aircraft that are associated with the provisionally selected satellite beam for which the beam utilization score does not meet the beam utilization criteria during the service timeframe;
creating a ranked list of the identified aircraft based at least in part on a beam flexibility metric associated with each of the identified aircraft; and
selecting the first aircraft based at least in part on the ranked list.

6. The method of claim 5, wherein the beam flexibility metric is based at least in part on a number of available satellite beams for the each of the identified aircraft during the service timeframe.

7. The method of claim 4, wherein the first aircraft is randomly selected from among aircraft associated with the provisionally selected satellite beam for which the beam utilization score does not meet the beam utilization criteria during the service timeframe.

8. The method of claim 2, further comprising:
iteratively performing the provisionally selecting and acquiring steps to obtain a plurality of candidate satellite beam assignment sets, each of the plurality of candidate satellite beam assignment sets having respective sets of the plurality of satellite beams for providing the network access service to each of the plurality of aircraft during the service timeframe, wherein each satellite beam of each of the respective sets of candidate satellite beams of each of the plurality of candidate satellite beam assignment sets has a beam utilization score that meets the beam utilization criteria during the service timeframe.

9. The method of claim 2, wherein the beam utilization criteria comprises one or more of the beam utilization scores remaining below a threshold during the service timeframe, a maximum amount of time the beam utilization scores may exceed the threshold in the service timeframe, a maximum difference between a given beam utilization score and an average of the beam utilization scores for the plurality of satellite beams over the service timeframe, or a variance of the beam utilization scores for the plurality of satellite beams being below a variance threshold.

10. The method of claim 1, wherein the selecting the satellite beams comprises selecting the satellite beams based at least in part on a cost of utilization of each of the respective candidate satellite beams, minimizing a number of satellite beam handovers for the plurality of aircraft, minimizing handovers to a satellite beam of a satellite different from the satellite currently serving an aircraft, or a combination thereof.

11. The method of claim 1, wherein the obtaining the beam utilization scores for the each of the respective candidate satellite beams is based at least in part on an estimated service utilization associated with the each of the plurality of aircraft over the service timeframe.

12. The method of claim 1, wherein the plurality of satellite beams include a first plurality of satellite beams of a first size and a second plurality of satellite beams of a second, different size.

13. The method of claim 12, wherein a coverage area for at least one of the second plurality of satellite beams is located within a coverage area for one of the first plurality of satellite beams.

14. The method of claim 1, wherein the plurality of satellite beams are provided via a plurality of satellites.

15. The method of claim 1, wherein the selecting is based at least in part on receiving a handover evaluation trigger.

16. The method of claim 15, wherein the received handover evaluation trigger comprises one or more of a periodic trigger, detecting an aircraft within a certain distance from an edge of a satellite beam currently serving the aircraft, detecting an aircraft entering into an overlapping region of multiple satellite beams, beam utilization of a satellite beam of the plurality of satellite beams exceeding a capacity threshold, a number of aircraft serviced by a satellite beam of the plurality of satellite beams exceeding an aircraft threshold, a number of users of a satellite beam of the plurality of satellite beams exceeding a user threshold, a change in the flight plan data, detecting a difference of beam utilization between two or more satellite beams exceeding a beam delta threshold, or a service level of the network access service to an aircraft falling below a service threshold.

17. The method of claim 1, wherein the beam utilization score of each candidate satellite beam is based on a plurality of beam utilization factors comprising a combination of: empirical beam utilization data, a number of fixed terminals serviced by each of the plurality of satellite beams, provisioned service levels for the fixed terminals, historical beam utilization data, an estimated number of the passengers utilizing the network access service on each aircraft, a service level offered to the passengers utilizing the network access service on each aircraft.

18. The method of claim 17, wherein the beam utilization scores comprise a weighted sum of the plurality of beam utilization factors.

19. An apparatus for satellite beam handover management for aircraft in a satellite communication system comprising a plurality of satellite beams, comprising:
a processor;
memory in electronic communication with the processor; and
instructions stored in the memory; wherein the instructions are executable by the processor to cause the apparatus to:
retrieve flight plan data for a plurality of aircraft being provided a network access service for passengers via the satellite communication system;
identify, for each aircraft of the plurality of aircraft based at least in part on the flight plan data, respective candidate satellite beams of the plurality of satellite beams for providing the network access service over a service timeframe;
obtain, for the plurality of satellite beams for the service timeframe, a beam utilization score indicative of predicted beam utilization over the service timeframe;
select, over the service timeframe, satellite beams for providing the network access service for each aircraft of the plurality of aircraft based at least in part on the beam utilization scores for the respective candidate satellite beams; and
schedule at least one handover for at least one of the plurality of aircraft to a selected satellite beam during the service timeframe.

20. The apparatus of claim 19, wherein the instructions operable to cause the apparatus to obtain and select are executable by the processor to cause the apparatus to:
provisionally select, for each of the plurality of aircraft, one or more of the candidate satellite beams for providing the network access service during the service timeframe;
acquire the beam utilization scores for the plurality of satellite beams during the service timeframe according to the provisional selection of the one or more of the candidate satellite beams for the each of the plurality of aircraft; and
adopt the provisionally selected one or more of the candidate satellite beams for the each of the plurality of aircraft upon determining that the beam utilization scores for the plurality of satellite beams meet beam utilization criteria for the service timeframe.

21. The apparatus of claim 20, wherein for each of the plurality of aircraft, the one or more of the candidate satellite beams are used successively over the service timeframe.

22. The apparatus of claim 20, wherein the instructions are executable by the processor to cause the apparatus to:
iteratively perform the provisionally selecting and acquiring until the beam utilization scores for the plurality of satellite beams meet the beam utilization criteria for the service timeframe, wherein, for each iteration, the provisionally selecting comprises:
exchange, for a first aircraft having a provisionally selected satellite beam having a beam utilization score that does not meet the beam utilization criteria for the service timeframe, the provisionally selected satellite beam for a substitute satellite beam for at least a portion of the service timeframe.

23. The apparatus of claim 22, wherein, for each iteration, the instructions operable to cause the apparatus to exchange the provisionally selected satellite beam for the substitute satellite beam are executable by the processor to cause the apparatus to:
identify aircraft that are associated with the provisionally selected satellite beam for which the beam utilization score does not meet the beam utilization criteria during the service timeframe;
create a ranked list of the identified aircraft based at least in part on a beam flexibility metric associated with each of the identified aircraft; and
re-select, for the one or more of the plurality of aircraft, the different one of the respective candidate satellite beams for providing the network access service based at least in part on the ranked list.

24. The apparatus of claim 23, wherein the beam flexibility metric is based at least in part on a number of available satellite beams for the each of the identified aircraft during the service timeframe.

25. The apparatus of claim 22, wherein the first aircraft is randomly selected from among aircraft associated with the provisionally selected satellite beam for which the beam utilization score does not meet the beam utilization criteria during the service timeframe.

26. The apparatus of claim 20, wherein the instructions are executable by the processor to cause the apparatus to:
iteratively perform the provisionally selecting and acquiring to obtain a plurality of candidate satellite beam assignment sets, each of the plurality of candidate satellite beam assignment sets having respective sets of the plurality of satellite beams for providing the network access service to each of the plurality of aircraft during the service timeframe, wherein each satellite beam of each of the respective sets of candidate satellite beams of each of the plurality of candidate satellite beam assignment sets has a beam utilization score that meets the beam utilization criteria during the service timeframe.

27. The apparatus of claim 20, wherein the beam utilization criteria comprises one or more of the beam utilization scores remaining below a threshold during the service timeframe, a maximum amount of time the beam utilization scores may exceed the threshold in the service timeframe, a maximum difference between a given beam utilization score and an average of the beam utilization scores for the plurality of satellite beams over the service timeframe, or a variance of the beam utilization scores for the plurality of satellite beams being below a variance threshold.

28. The apparatus of claim 19, wherein the selecting the satellite beams comprises selecting the satellite beams based at least in part on a cost of utilization of each of the respective candidate satellite beams, minimizing a number of satellite beam handovers for the plurality of aircraft, minimizing handovers to a satellite beam of a satellite different from the satellite currently serving an aircraft, or a combination thereof.

29. The apparatus of claim 19, wherein the obtaining the beam utilization scores for the each of the respective candidate satellite beams is based at least in part on an estimated service utilization associated with the each of the plurality of aircraft over the service timeframe.

30. The apparatus of claim 19, wherein the plurality of satellite beams include a first plurality of satellite beams of a first size and a second plurality of satellite beams of a second, different size.

31. The apparatus of claim 30, wherein a coverage area for at least one of the second plurality of satellite beams is located within a coverage area for one of the first plurality of satellite beams.

32. The apparatus of claim 19, wherein the plurality of satellite beams are provided via a plurality of satellites.

33. The apparatus of claim 19, wherein the selecting is based at least in part on receiving a handover evaluation trigger.

34. The apparatus of claim 33, wherein the received handover evaluation trigger comprises one or more of a periodic trigger, detecting an aircraft within a certain distance from an edge of a satellite beam currently serving the aircraft, detecting an aircraft entering into an overlapping region of multiple satellite beams, beam utilization of a satellite beam of the plurality of satellite beams exceeding a capacity threshold, a number of aircraft serviced by a satellite beam of the plurality of satellite beams exceeding an aircraft threshold, a number of users of a satellite beam of the plurality of satellite beams exceeding a user threshold, a change in the flight plan data, detecting a difference of beam utilization between two or more satellite beams exceeding a beam delta threshold, or a service level of the network access service to an aircraft falling below a service threshold.

35. The apparatus of claim 19, wherein the beam utilization score of each candidate satellite beam is based on a plurality of beam utilization factors comprising a combination of: empirical beam utilization data, a number of fixed terminals serviced by each of the plurality of satellite beams, provisioned service levels for the fixed terminals, historical beam utilization data, an estimated number of the passengers utilizing the network access service on each aircraft, a service level offered to the passengers utilizing the network access service on each aircraft.

36. The apparatus of claim 35, wherein the beam utilization scores comprise a weighted sum of the plurality of beam utilization factors.

* * * * *